United States Patent [19]

Farrell et al.

[11] Patent Number: 5,095,342

[45] Date of Patent: Mar. 10, 1992

[54] METHODS FOR SHEET SCHEDULING IN AN IMAGING SYSTEM HAVING AN ENDLESS DUPLEX PAPER PATH LOOP

[75] Inventors: Michael E. Farrell, Fairport; Pedro R. Oritz, Webster; John C. Austin, Rochester; Robert W. Hurtz, Victor; Alfred L. Bertoni, Fairport, all of N.Y.

[73] Assignee: Xerox Corporation, Stamford, Conn.

[21] Appl. No.: 590,236

[22] Filed: Sep. 28, 1990

[51] Int. Cl.$^5$ ............................................. G03G 15/00
[52] U.S. Cl. ................................. 355/319; 355/23; 355/24; 355/77
[58] Field of Search ........................... 355/23-26, 355/77, 318, 319, 323

[56] References Cited

U.S. PATENT DOCUMENTS

| | | |
|---|---|---|
| 4,099,254 | 7/1978 | Andrews et al. . |
| 4,278,344 | 7/1981 | Sahay . |
| 4,348,101 | 9/1982 | Schonfeld et al. . |
| 4,385,825 | 5/1983 | Kaneko . |
| 4,453,841 | 6/1984 | Bobick et al. . |
| 4,468,114 | 8/1984 | Pels et al. .......................... 355/24 X |
| 4,561,772 | 12/1985 | Smith ................................. 355/24 X |
| 4,639,126 | 1/1987 | Burshaw ........................... 355/77 X |
| 4,681,428 | 7/1987 | Devoy . |
| 4,699,503 | 10/1987 | Hyltoft . |
| 4,708,462 | 11/1987 | Stemmle ........................... 355/77 X |
| 4,782,363 | 11/1988 | Britt et al. . |
| 4,803,522 | 2/1989 | Sasaki .................................. 355/26 |
| 4,845,527 | 7/1989 | Maruta et al. . |
| 4,908,660 | 3/1990 | Ohira et al. . |
| 4,918,490 | 4/1990 | Stemmle . |
| 4,928,127 | 5/1990 | Stemmle ......................... 355/319 X |
| 4,928,128 | 5/1990 | Stemmle ......................... 355/319 X |
| 4,934,681 | 6/1990 | Holmes et al. . |
| 4,935,786 | 6/1990 | Veeder . |
| 4,941,023 | 7/1990 | Holmes et al. . |
| 4,975,738 | 12/1990 | Senma et al. ....................... 355/77 |

FOREIGN PATENT DOCUMENTS 0295612  12/1988  European Pat. Off. .

Primary Examiner—R. L. Moses
Attorney, Agent, or Firm—Oliff & Berridge

[57] ABSTRACT

Methods for scheduling sheets in an imaging system having an endless duplex paper path loop are disclosed. Preferably, the duplex loop includes a single sheet inverter without a buffer tray so as to eliminate the problems associated therewith. The basic method involves consecutively inserting copy sheets to be imaged into the duplex loop without placing any skipped pitches therebetween regardless of set or job boundaries. Duplex side ones from subsequent sets or jobs are used to fill any gaps which exist in the duplex side one sheet stream of earlier sets or jobs. Additional refinements include using simplex sheets to fill potential skipped pitches in a duplex side one sheet stream by converting simplex sheets located immediately subsequent to the duplex sheets into duplex sheets having a blank back side and scheduling the side one imaging of the now-converted duplex sheets into the potential skipped pitches. Potential skipped pitches can also be filled by shifting an appropriate number of simplex sheets at a simplex-to-duplex transition into any potential skipped pitches in an immediately subsequent duplex side one sheet stream. Further refinements include using duplex or simplex sheets to fill gaps which exist in a duplex side two sheet stream due to skip requests which occurred during the side one scheduling, inserting or imaging.

51 Claims, 15 Drawing Sheets

FIG. 7

METHODS FOR SHEET SCHEDULING IN AN IMAGING SYSTEM HAVING AN ENDLESS DUPLEX PAPER PATH LOOP

BACKGROUND OF THE INVENTION

1. Field of the Invention

The present invention is directed generally to printing duplex and simplex copy sheets from electronic page information, especially suitable for low cost electrostatographic, ink jet, ionographic or other on-demand page printers with an endless duplex paper path loop. More particularly, the disclosed invention relates to methods for more efficiently scheduling copy sheets for insertion into and imaging by an imaging apparatus located within a portion of an endless duplex paper path loop whereby the number of skipped printer pitches is minimized, for more closely spaced or continuous production of duplex and simplex copy sheets, for higher overall productivity, yet with low page buffer memory storage requirements.

2. Description of Related Art

The terminology "copiers", and "copies", as well as "printers" and "prints", is used alternatively herein. The terminology "imaging" and "marking" is used alternatively herein and refers to the entire process of putting an image (digital or analog source) onto paper. The image can then be permanently fixed to the paper by fusing, drying, or other means. It will be appreciated that the invention may apply to almost any system in which the images are made electronically, including electronic copiers.

There is disclosed herein a simple, low cost duplexing system for efficiently utilizing a printer with a simple integrated copy sheet output and duplexing return path. It is particularly suitable for a trayless, endless loop, duplexing path.

The disclosed system provides for efficient nondirectly-sequential document page copying order or sequencing yet is capable of providing collated duplex copy sets therefrom, without requiring a large number of page images to be stored in electronic memory buffers even for jobs with a large number of pages.

It is generally known that electronically inputted printers can desirably provide more flexibility in page sequencing (page, copying presentation order) than copiers with physical document sheet input. The printer input is electronically manipulatable electronic page media, rather than physical sheets of paper which are much more difficult to reorder or manipulate into a desired sequence. As also shown in the art noted hereinbelow, it is generally known that certain such reordered or hybrid document page copying orders or sequences may be copied onto a corresponding sequential train of copy sheets in an appropriate copier or printer to provide higher copying machine productivity yet correct page order copy output, especially for duplex copies made with a copier with trayless duplexing, i.e., providing a limited length endless buffer loop duplexing path for the copy sheets being duplexed. The system disclosed herein provides for improvements therein.

The Xerox Corporation "9700" printer, duplex version, for example, has a long duplex paper path, and is suited to print long jobs. It operates in essentially a trayless mode, with a long duplex loop path. Initially, prints (copies) of only the even sides are made, with one skip cycle between each print until the entire paper path is filled with even side prints alternated with skipped cycles. When the first completed even side (page 2) reaches the transfer area for the second side print (page 1), that page is printed on the back side. The next print to be made, however, is the next even side in the sequence printed on a blank sheet, and interleaved in the blank spaces (previously skipped cycles) left between sheets on the first pass. Thus, the job then proceeds at full productivity, intermixing even sides printed on blank sheets for the first pass with odd sides printed on the back of previously completed even sides on their second pass. After the last even side is printed, the system resumes the skip cycle operation until all the odd sides are printed on the last of the even side prints.

For a 30 page job, this "9700" printer duplex version page copying sequence can be represented as shown below. [Each "S" represents a skipped cycle. Previously printed sheet pages making their second pass for their second side copy are shown under the slash.]

First stage—[evens copied +skips =half productivity]: 2, S, 4, S, 6, S, 8;

Second stage—[odds and evens intermixed—full productivity]: 1/2, 10, 3/4, 12, 5/6, 14, 7/8, 16, 9/10, 18, 11/12, 20, 13/14, 22, 15/16, 24, 17/18, 26, 19/20, 28, 21/22, 30;

Third stage—[Odds copied +skips =half productivity]; 23/24, S, 25/26, S, 27/28, S, 29/30.

Note that with this "9700" printer sequence, 36 machine cycles are required to make 30 prints. So, for this 30 page job, the overall duplex operation is only 83% efficient. For longer jobs, the effective efficiency improves. But for shorter jobs the overall efficiency degrades, since there will still be 6 skipped pitches—"S".

The sequence used on Xerox Corporation "5700" printer is somewhat similar, except that it is not a trayless duplex loop system. All the completed first side sheets are stacked into a duplex buffer tray and later refed for side two printing. With this system, printer skip cycles are not required during the first stage of the job. The skip cycles are also not required for the third stage since the completed side ones can be fed at full thruput from the duplex tray. Thus, the "5700" duplexing is much more efficient than in the "9700". However, such duplex tray systems are inherently less reliable in some respects. The required duplex tray stacking, reseparating, and refeeding is implicated in the vast majority of duplex paper jams, and complicates job recovery. That is eliminated with the "9700" and other endless moving path duplex buffer loop systems.

Other conventional sequences for printers are also possible. For example, the Hewlett Packard HP "2000" uses a stack and re-feed method of duplex in which all even sides of the entire job are printed, followed by printing all of the odd sides. However, for this, the entire job (all the page images) must be stored in memory in order to insure jam recovery.

It is desirable to provide duplexing devices using the trayless duplex buffer loop technology, particularly for smaller and less expensive printers. Thus, sequences such as are used for the Xerox "5700" and HP "2000" printers are not appropriate since they require a duplex tray for the copy sheet stacking and re-feeding. The "9700" printer method is also inappropriate because of said inefficiency for short jobs. (Jobs with a small number of document pages and corresponding copy pages per set.) Short jobs predominate in many user's needs. Irrespective of the job size, the "9700" printer method always requires 6 skipped pitches: 3 for the first series of even sides, and 3 for the last series of odd sides, as discussed.

It is also desirable to provide a copy sheet sequencing schedule which is highly efficient even when a job or a series of jobs to be printed consecutively includes one or more sheet groups containing one or more simplex sheets interspersed throughout a plurality of duplex sheets. When one or more simplex sheets are to be imaged following the imaging of one or more duplex sheets, it is necessary to schedule the simplex sheets for side one imaging after scheduling the duplex sheets for side two imaging if the output order of the sheets from the imaging device must be preserved. When using an imaging device having an endless duplex paper path loop to print simplex sheets after duplex sheets, skipped pitches are usually required to be scheduled after the duplex side one scheduling until the duplex paper path loop is "filled" (i.e., filled with duplex side ones and skipped pitches). The duplex sheets imaged with side one images are then scheduled for side two imaging upon being recirculated through the duplex loop, and then the subsequent simplex sheets are scheduled in order to preserve the output order of the sheets. Thus, undesirable skipped pitches are required.

A somewhat similar situation arises when the simplex sheets precede the duplex sheets in the order of required output from the imaging system. Conventional imaging systems schedule the simplex sheets for imaging prior to scheduling the duplex sheets. Thus, if the number of duplex sheets to be imaged is less than the number of pitches contained in the endless duplex paper path loop, skipped pitches are scheduled after scheduling the duplex side ones.

Another source of inefficiencies in the overall productivity of imaging systems having an endless duplex paper path loop results when, in response to a "skip request", the imaging system does not schedule a duplex sheet in a pitch of the endless duplex paper path loop for side one imaging. A "skip request" can emanate from, for example, the paper path when a sheet of paper is not ready for insertion into the paper path, the xerographic control system, or the Input-Output Terminal (IOT) when it is informed that an image is not ready to be printed (e.g., the image to be printed has not yet been completely retrieved from memory). When a skip request is produced, an unexpected gap results in the stream of sheets scheduled for side one imaging in the duplex loop. Since these sheets are recirculated through the duplex loop for side two imaging, any unexpected gaps which exist in the side one sheet stream also exist in the side two sheet stream. The gaps in the side two sheet stream which result from unexpected gaps in the side one sheet stream are also referred to as the "back of the skip request". While the gap in sheet scheduling due to the skip request cannot be avoided, it is desirable to eliminate scheduling of the back of the skip request. If the back of the skip request can be eliminated, the number of gaps which are produced during duplex imaging due to skip requests can be reduced by 50%.

Of particular prior art interest is Mead Corporation U.S. Pat. No. 4,453,841 issued June 12, 1984 to Bobick et al disclosing a trayless duplexing buffer loop path printer system, and noting particularly the page copying sequences shown in FIG. 6, particularly for documents with more than 10 pages, e.g., the examples shown with 16 and 22 pages.

Also of particular interest for also showing page copying sequences or algorithms for a trayless buffer loop duplexing printer is Canon EP 0 295 612 A1 (European patent application) published Dec. 21, 1988 by A. Noguchi et al.

The above-cited Mead Corporation U.S. Pat. No. 4,453,841 to Bobick et al is of particular interest for its apparent disclosure of a printer with a batch mode algorithm page order presentation, as particularly shown in FIG. 6 thereof. However, that algorithm appears to operate with the document pages in descending (N to 1) rather than ascending (1 to N) page order, so that printing cannot be started until the entire job is downloaded or buffered, and requiring therefore an electronic storage media of sufficient capacity to hold all the pages of the entire document set or job. If pages are bit-mapped, as with mixed graphics, a megabyte or more of memory per page may be required even with data compression and for only 300 spi. Thus, because most computers send information in ascending serial order (starting with page 1), and most printers print in that order, an expensive print server may be required to store and reverse the order to the job before printing. That is disadvantageous for a decentralized environment without a print server available, or without high baud rate downloading connecting lines from a large central computer. First copy out time can be greatly improved with 1 to N ascending page order since printing can start as soon as the first page is received rather than after the whole job is received; which can be a very long time for a multipage job sent over conventional lines, or even coaxial cable, particularly with bit mapped pages. Ascending or forward (1 to N) page order is also very helpful for duplexing, since a decision as to the last page being even or odd (simplex) does not have to be made until that last page is downloaded, nor does any separate job handling instruction have to be sent in advance for that last odd (simplex) page situation. The printer can handle that situation on its own.

U.S. Pat. No. 4,453,841 apparently converts a simplex sheet to a duplex sheet having a blank back side (see the odd document page number examples of FIG. 6 as well as col. 7, lines 42–45), but apparently only for the special situation where the last sheet of a document being coped is an odd numbered sheet. The criteria as well as the procedure for printing a simplex sheet as a duplex sheet with a blank back side are not discussed. This patent also apparently does not address the situation where a simplex sheet is located at an intermediate position within a copy set, only when it is the last sheet (or first sheet) in the set. Additionally, as demonstrated by the 16 and 22 page examples provided, skipped pitches exist between consecutive sets being scheduled.

By way of examples of further background on electronic (vs physical) page input and buffering for duplex copying or printing there is noted U.S. Pat. Nos. 4,099,254 and 4,699,503. Also, Xerox Disclosure Journal publication Vol. 8, No. 1, January/February 1983, p. 7, and its description of the Xerox "9700" duplex version laser printer and its trayless duplexing buffer loop operation. The latter and other electronic document input printers normally provide precollated output, by sequentially making one copy at a time of each document page in repeated copying "circulations" thereof, rather than making plural consecutive identical copies and utilizing sorters (post-collation). As noted in various examples in this art, and discussed further herein, there are different requirements for RDH, or pre-collation, copying vs post-collation or multicopy/-sorter, copying. Maintaining collation of the documents and copies without productivity losses is a particular problem, and has been the subject of sequencing and inverting algorithms, as shown in the art.

U.S. Pat. No. 4,918,490 issued Apr. 17, 1990 to Denis J. Stemmle (Xerox Corporation) discloses an endless duplex paper path loop having a single sheet inverter for inverting sheets in the duplex loop after side one image. Sheets are consecutively inserted into the duplex loop to avoid the first and third stage skipped pitches discussed above with reference to the "9700" system. Sheets are scheduled in 1-N order, with each multipage job set being electronically divided into consecutive batches, each batch containing a small number of pages equal to approximately twice the copy sheet length.

U.S. Pat. No. 4,935,786 issued June 19, 1990 to Veeder (D.E.C.) discloses another printer having an endless duplex paper path loop with a sheet inverter. Sheets appear to be scheduled for duplex printing somewhat like the "9700" printer duplex schedule in that skipped pitches are provided during a first stage of operation. See column 3, line 46-column 4, line 14; column 6, lines 48-64; column 15, line 17-column 16, line 68; and FIG. 8. Thus, skipped pitches will exist at the beginning and end of every printing operation. This patent also appears to disclose beginning printing of one document or job unit before the last sheets of a previous document are discharged. See column 24, line 39-column 25, line 11 and FIG. 15. However, all descriptions and examples are directed to homogeneous duplex jobs. No reference is made to jobs containing simplex and duplex sheets and consequently no reference is made to handling simplex to duplex and duplex to simplex transitions.

U.S. Pat. Nos. 4,934,681 and 4,941,023 to Holmes et al (Xerox Corporation) disclose a duplex copying process wherein pitches are shuffled within the same duplex copy set for minimizing the number of skipped pitches that occur during a duplex copy cycle. A shuffling process used for a 2 pitch duplexing copy loop path length wherein pitch skips are inserted into an odd document set size duplex copy cycle and shuffling algorithms that are used to minimize pitch skips are specifically discussed for a 3 page simplex document/4 duplex copies job.

U.S. Pat. No. 4,278,344 to Sahay (Xerox Corporation) and U.S. Pat. No. 4,385,825 to Kaneko (Ricoh Co. Ltd.) disclose duplex paper path loops which are somewhat structurally similar to the present invention, but which to Britt et al (Xerox Corporation) also shows a duplex paper path loop similar to the present invention, but which includes an inverting duplex buffer tray therein. The 4,782,363 patent also discloses a type of post-collation "bindexer" unit which is usable with the present invention for collating the output from the duplex loop when necessary.

Other art of background interest includes: U.S. Pat. Nos. 4,348,101; 4,908,660; 4,845,527; and 4,681,428.

Some examples of other prior art copiers with document handlers, and especially with control systems therefor, including operator console switch selection inputs, document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270; and 4,475,156. It is well known in this art, and in general, how to program and execute document handler and copier control functions and logic with conventional or simple software instructions for conventional microprocessors in a copier controller. This is taught by the above and other patents and various commercial copiers. Such software may vary depending on the particular function and particular microprocessor or microcomputer system utilized, of course, but will be available to or readily programmable by those skilled in the applicable arts without experimentation, from either descriptions or prior knowledge of the desired functions together with general knowledge in the general software and computer arts. It is also known that conventional or specified document and copy sheet handling functions and controls may be alternatively conventionally provided utilizing various other known or suitable logic or switching systems.

All references cited in this specification, and their references, are incorporated by reference herein where appropriate for appropriate teachings of additional or alternative details, features and/or technical background.

OBJECTS AND SUMMARY OF THE INVENTION

It is an object of the present invention to provide methods for scheduling sheets for insertion into, imaging in, and outputting from a duplex paper path loop which reduces the number of skipped pitches, thereby increasing overall productivity of the marking system.

It is another object of the present invention to improve IOT print throughput, paper path utilization, and xerographic process utilization when scheduling groups of contiguous duplex sheets regardless of set or job boundaries.

It is another object of the present invention to provide improved methods of scheduling sheets for duplex printing in a duplex paper path loop having an endless loop architecture including a single sheet inverter with no buffer tray.

It is another object of the present invention to provide a method of scheduling sheets which reduces the number of skipped pitches produced when a skip request is issued by a component of the marking system.

It is a further object of the present invention to provide a method of scheduling a series of sheets comprising one or more sheet groups of one or more simplex sheets interspersed throughout a series of duplex sheets which reduces the number of skipped pitches.

To achieve the foregoing and other objects, and to overcome the shortcomings discussed above, methods for scheduling sheets in an imaging system having an endless duplex paper path loop are disclosed. Preferably, the duplex loop includes a single sheet inverter without a buffer tray so as to eliminate the problems associated therewith. The basic method involves consecutively inserting copy sheets to be imaged into the duplex loop without placing any skipped pitches therebetween regardless of set or job boundaries. Duplex side ones from subsequent sets or jobs are used to fill any gaps which exist in the duplex side one sheet stream of earlier sets or jobs. Additional refinements include using simplex sheets to fill potential skipped pitches in a duplex side one sheet stream by converting simplex sheets located immediately subsequent to the duplex sheets into duplex sheets having a blank back side and scheduling the side one imaging of the now-converted duplex sheets into the potential skipped pitches. Potential skipped pitches can also be filled by shifting an appropriate number of simplex sheets at a simplex-to-duplex transition into any potential skipped pitches in an immediately subsequent duplex side one sheet stream. Further refinements include using duplex or simplex sheets to fill gaps which exist in a duplex side two sheet stream due to skip requests which occurred during the side one scheduling, inserting or imaging.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface(UI) touchscreen of the printing system shown in FIG. 1;

DETAILED DESCRIPTION OF THE PREFERRED EMBODIMENTS

A. The System

Figure 1:
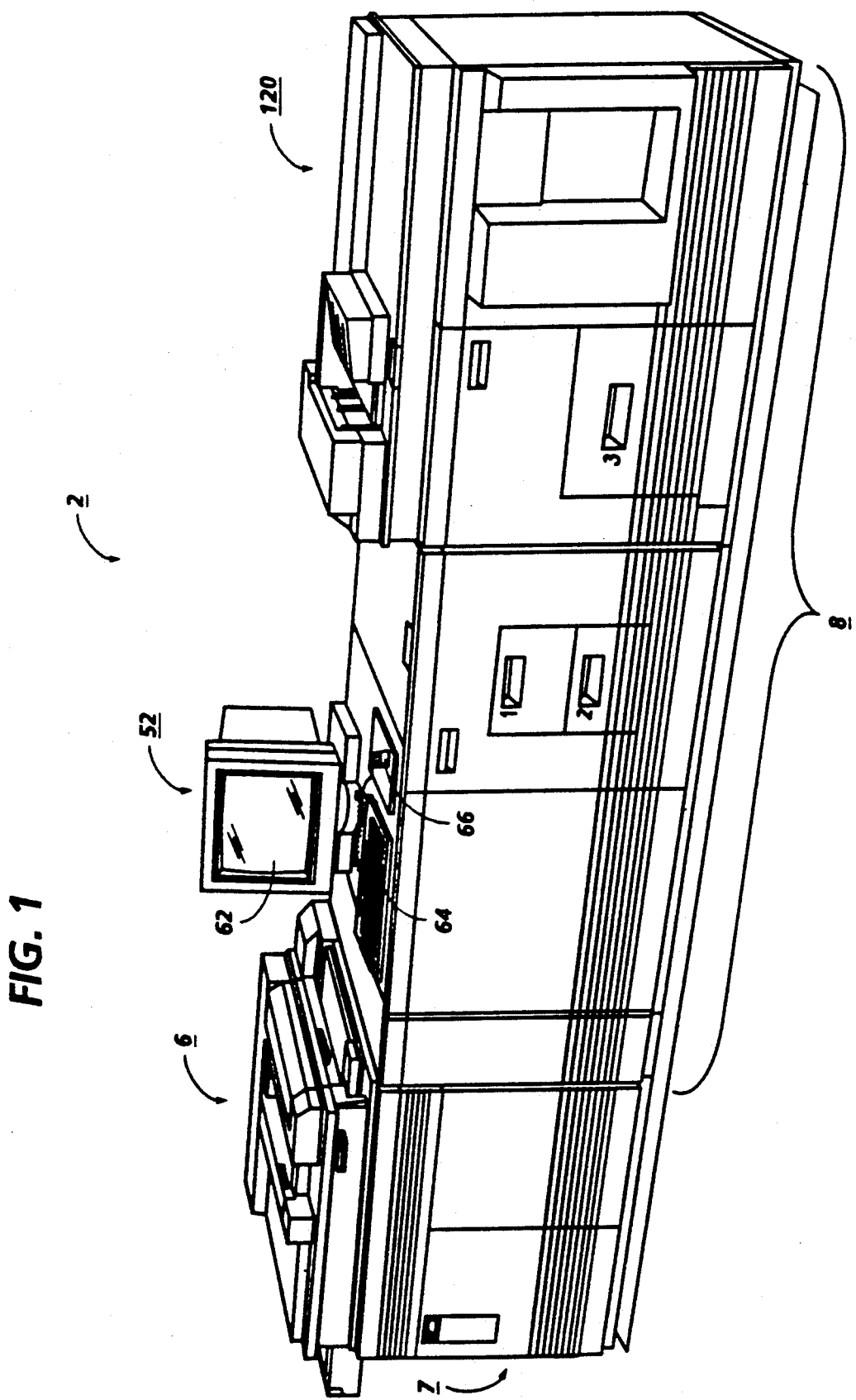
FIG. 1 is a view depicting an electronic printing system.
Figure 2:
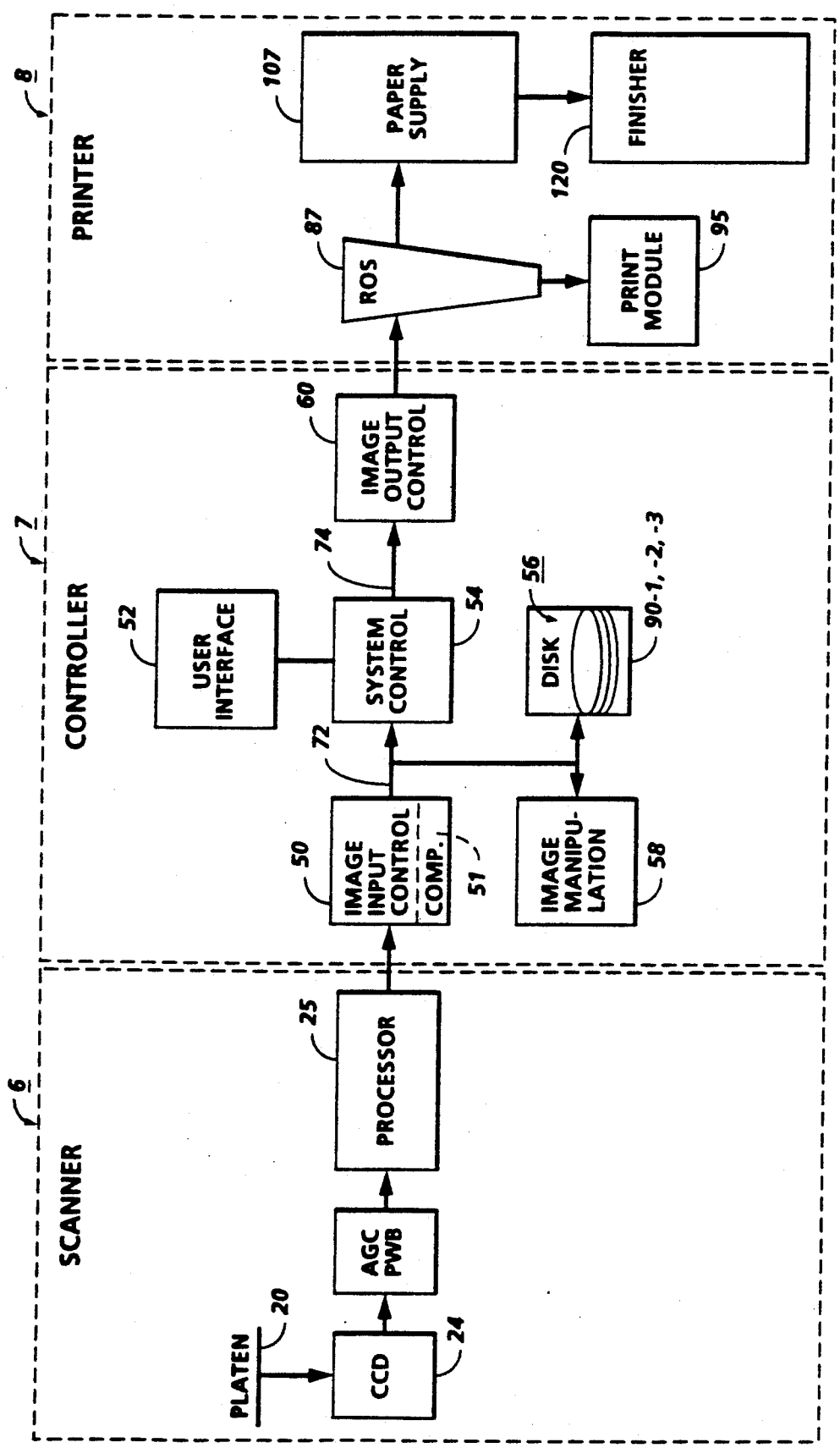
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
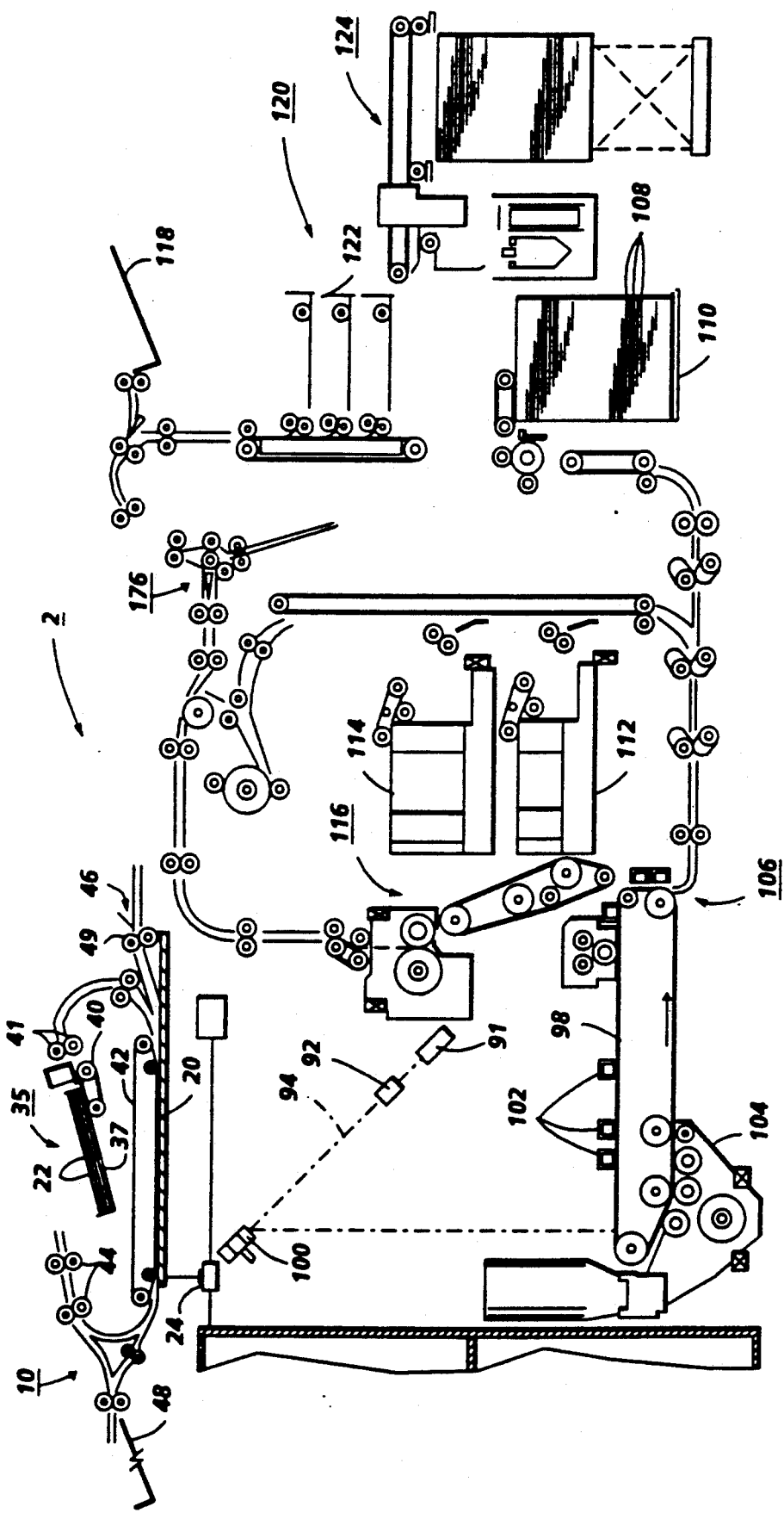
FIG. 3 is a plan view illustrating the principal mechanical components of the printing system shown in FIG. 1.
Figure 4:
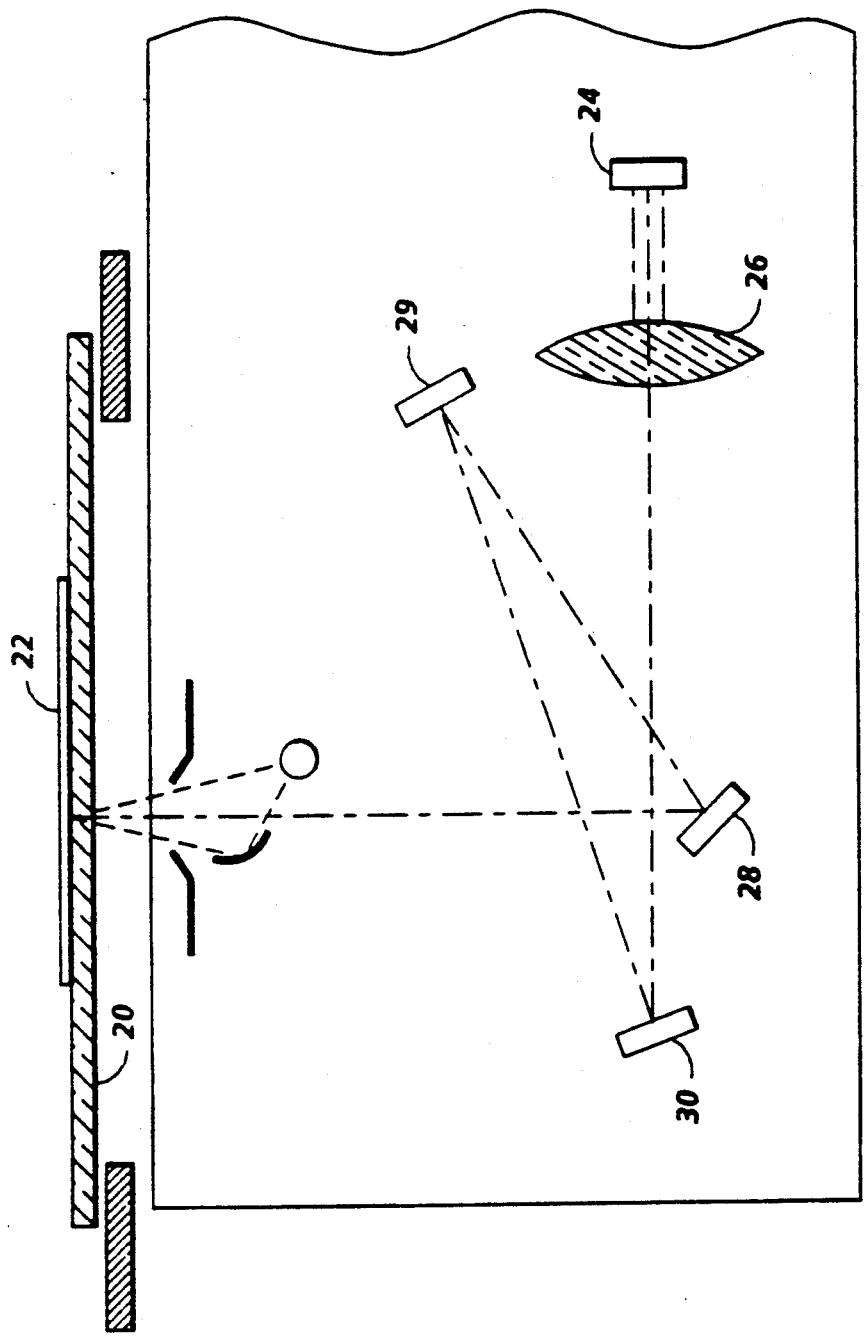
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 27 and mirrors 28, 29, 30 cooperate to focus array 24 on a line like segment of platen 20 and the document being scanned thereon. Array 24 provides image signals or pixels representative of the image scanned which, after suitable processing by processor 25, are output to controller section 7.

Processor 25 converts the analog image signals output by array 24 to digital image signals and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 42 onto platen 20 where the document is scanned by array 24. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface(UI) 52, system controller 54, main memory 56, image manipulation section 58, and image output controller 60.

The scanned image data input from processor 25 of scanner section 6 to controller section 7 is compressed by image compressor/processor 51 of image output input controller 50 on PWB 70-3. As the image data passes slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Figure 5A:
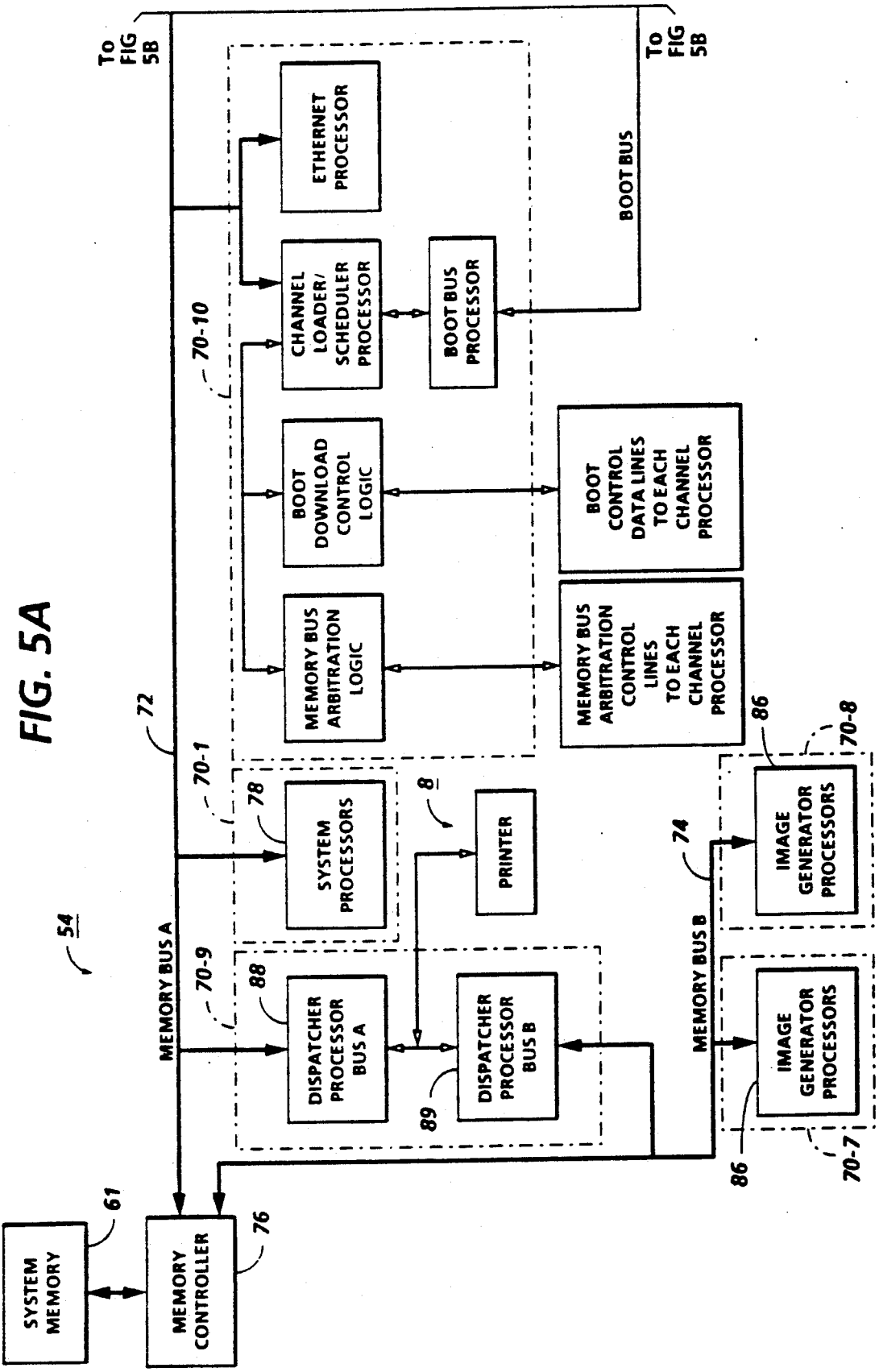
FIGS. 5a, 5b, 5c comprise a schematic block diagram showing the major parts of the control section for the printing system shown in FIG. 1.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
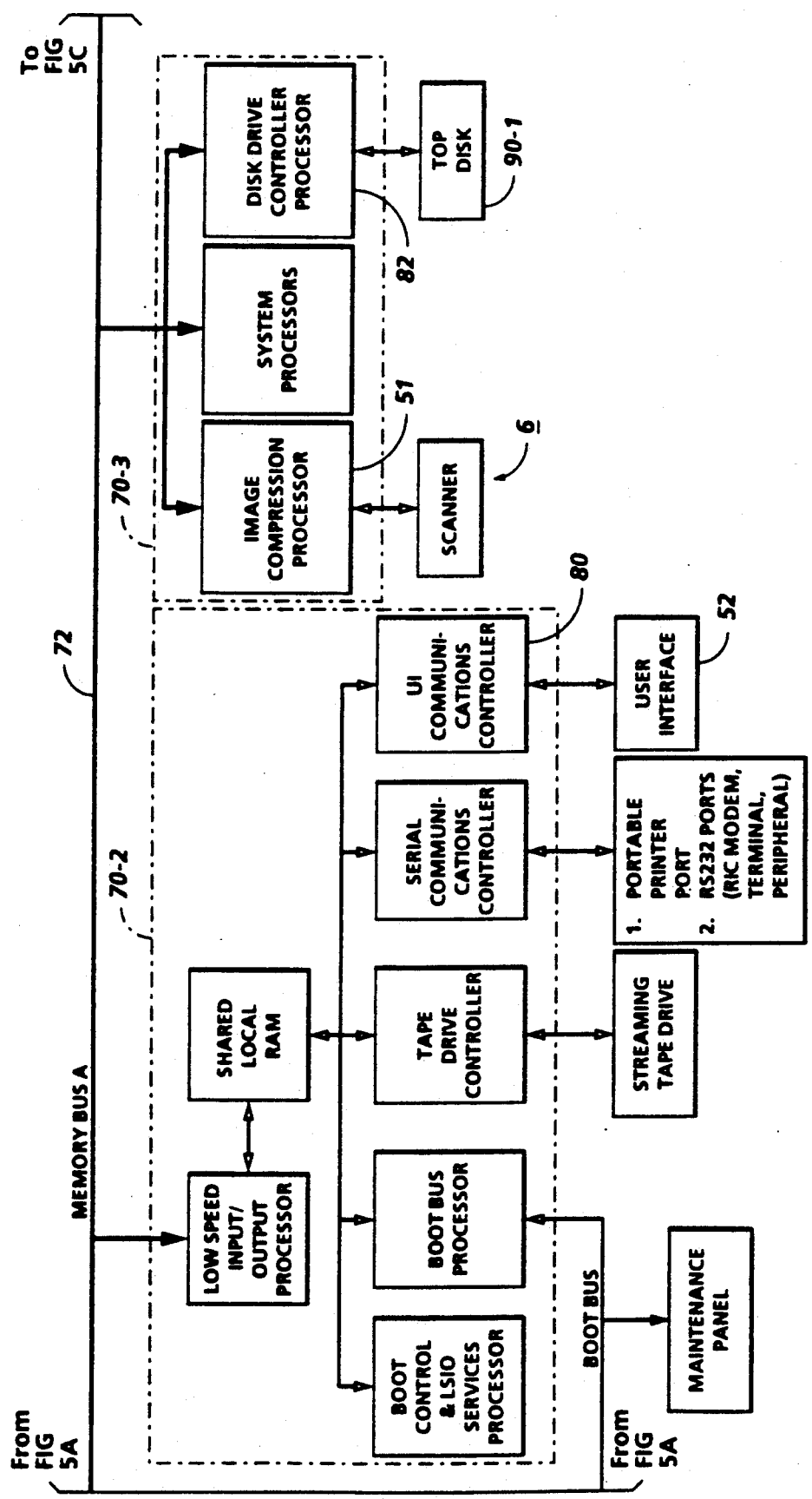
Figure 5C:
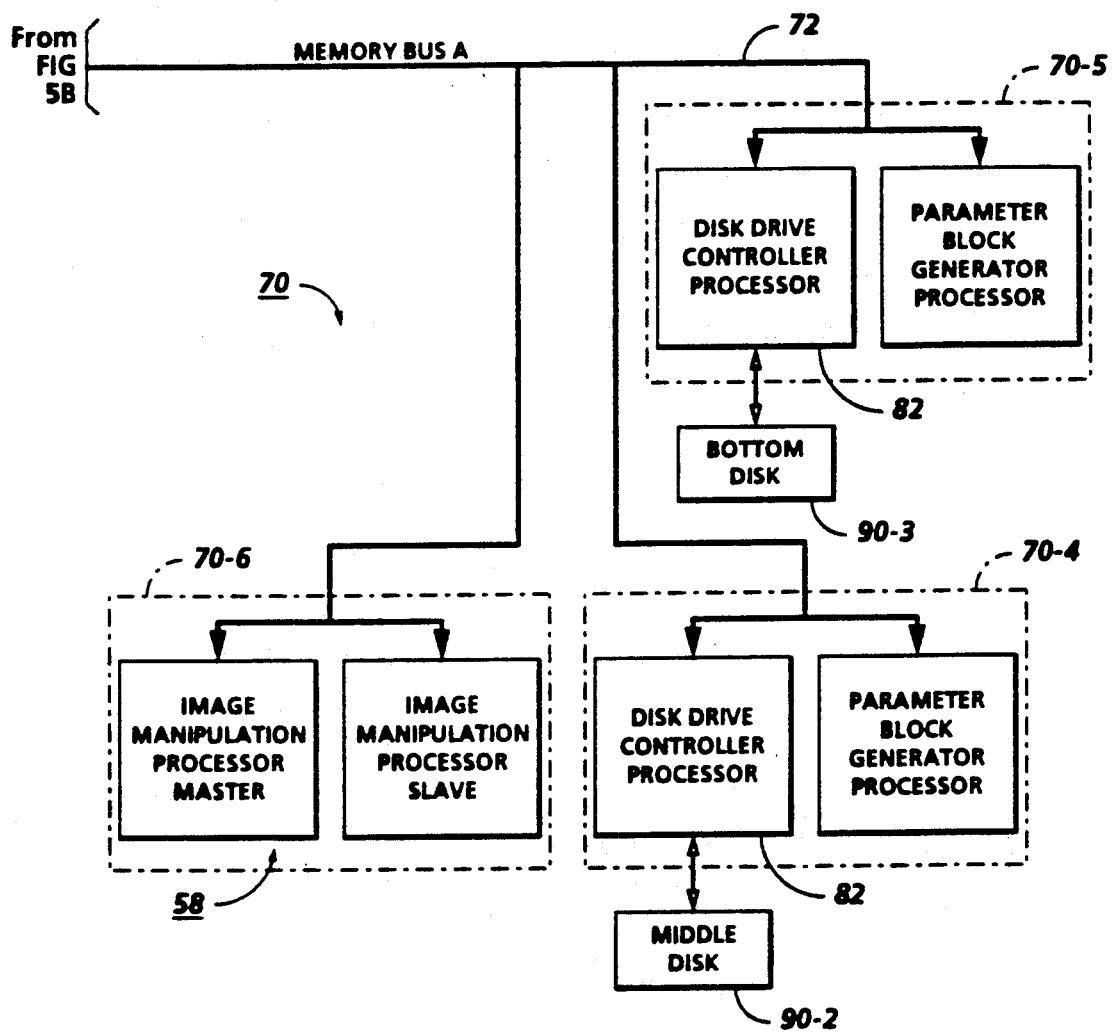

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
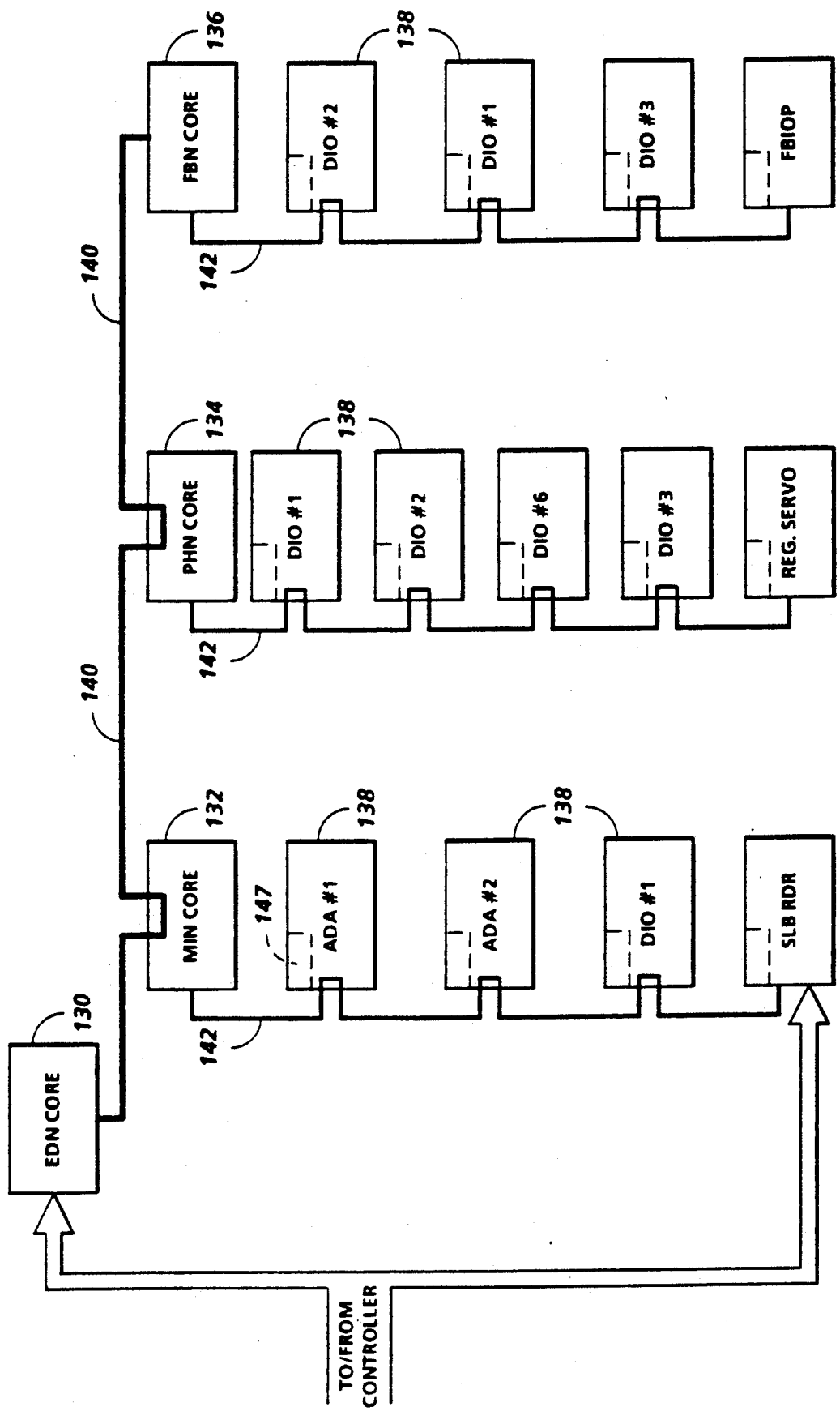
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN (electronic data node) core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to remaining core PWBs 132, 134, 136 via bus 140, each core PWB 130, 132, 134, 136 having a boot ROM 147 for controlling downloading of Operating System software to PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
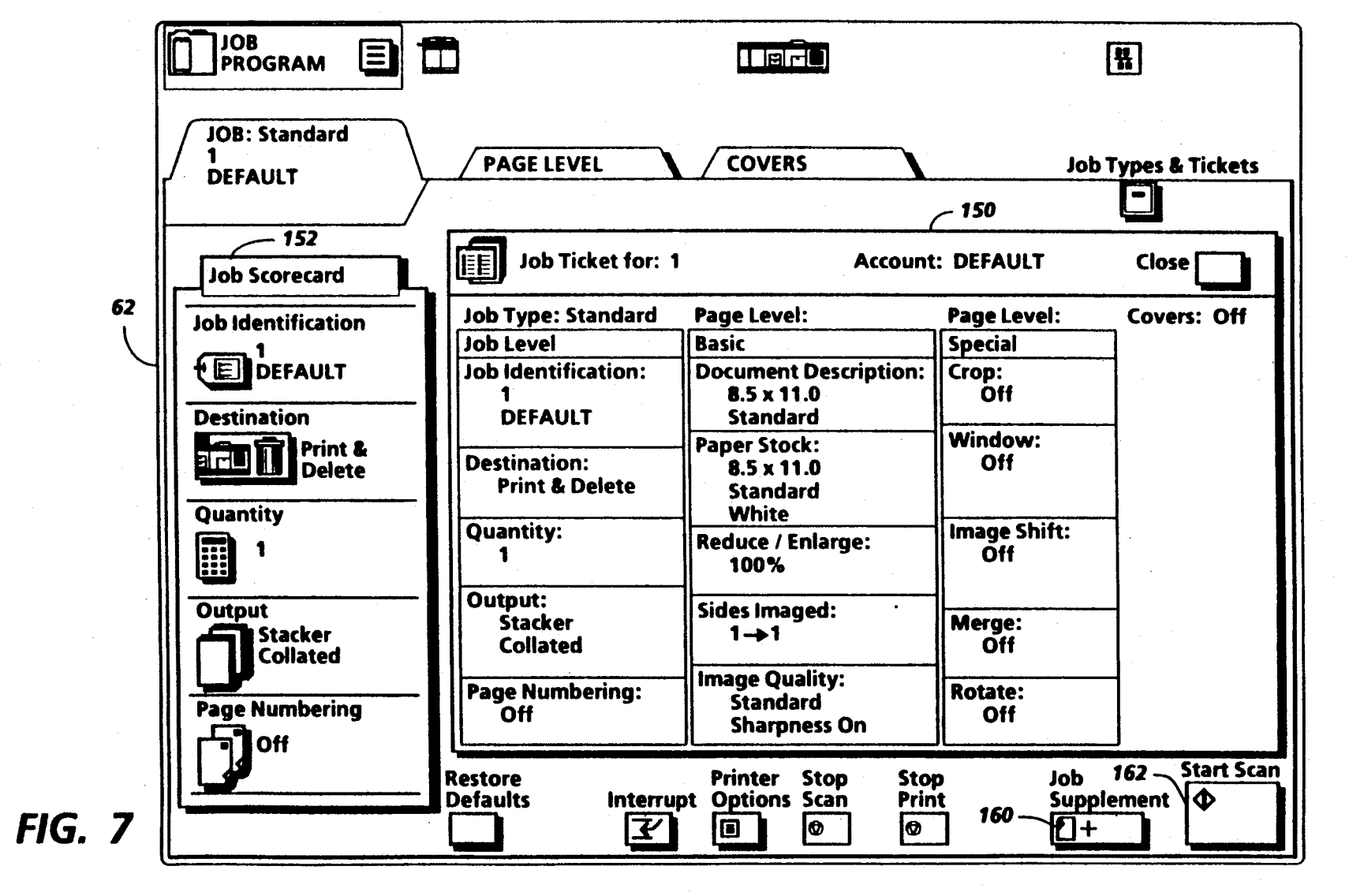

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. The Duplex Paper Path Endless Loop

Figure 8:
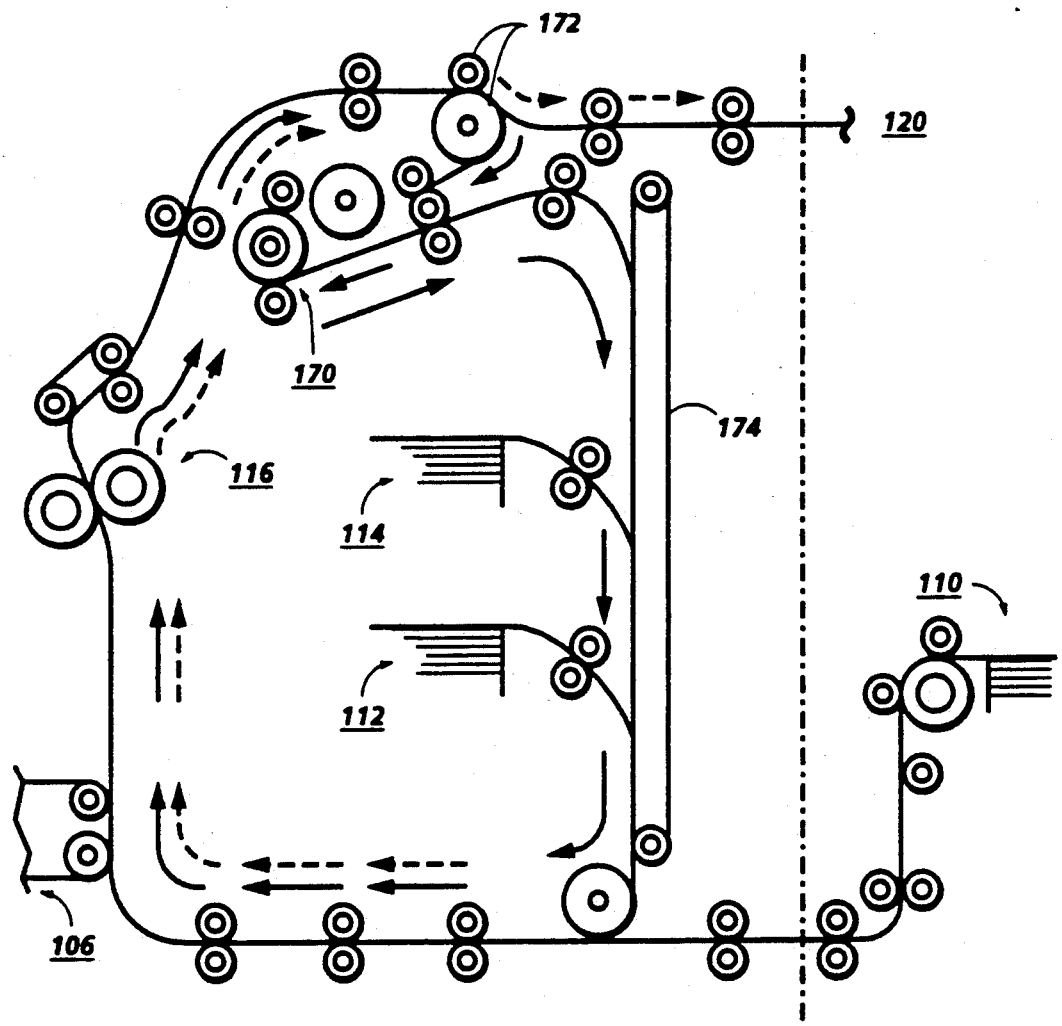
FIG. 8 is a plan view illustrating the duplex and simplex paper paths through which sheets are conveyed through the system of FIG. 3.

FIG. 8 is a plan view illustrating the duplex and simplex paper paths through which sheets are conveyed in the system of FIG. 3. In FIG. 8, the path through which a sheet travels during duplex imaging is illustrated by the arrowed solid lines, whereas the path through which a sheet to be simplex imaged is illustrated by the arrowed broken lines. After an appropriately sized sheet is supplied from one of feed trays 110, 112 or 114, the sheet is conveyed past image transfer station 106 to receive an image. The sheet then passes through fuser 116 where the image is permanently fixed or fused to the sheet. After passing through rollers 172, a gate (not shown) either allows the sheet to move directly to finisher 120, or deflects the sheet into single sheet inverter 170. If the sheet is either a simplex sheet or a duplex sheet having completed side one and side two images formed thereon, the sheet will be conveyed directly to finisher 120. If the sheet is a duplex sheet printed only with a side one image, the gate will deflect the sheet into inverter 170, where the sheet will be inverted and then fed to belt 174 for recirculation past transfer station 106 and fuser 116 for receiving and permanently fixing the side two image to the backside of the sheet. Examples of single sheet inverters usable with the present invention are disclosed in the previously described and incorporated U.S. Pat. Nos. 4,918,490; 4,935,786; 4,934,681; and 4,453,841. Unlike some previously designed duplex paper feed paths, the present invention includes a single sheet inverter and no duplex buffer tray. For a given paper path length, the duplex paper path architecture of the present invention offers a shorter duplex loop time because there is no sheet settling time nor sheet reacquisition time which is typically required with duplex architectures having a buffer tray therein. The absence of sheet buffering for the present architecture decreases the size of the duplex sheet tracking buffers in the IOT control system and reduces the maximum number of duplex path purge sheets. By eliminating buffering and reacquisition of sheets, this architecture eliminates the job integrity problems associated with delayed detection of duplex tray multifeeds. That is, since systems having duplex buffer trays therein frequently lead to job integrity problems due to more than one sheet being unintentionally fed from the buffer tray at a time, the elimination of the buffer tray eliminates this problem. Additionally, since less sheets exist in the duplex paper path at a time than when a buffer tray is employed, the controller which controls the imaging process need keep track of fewer copy sheets at a time. The single sheet inverter and duplex paper path employed in the present invention is capable of handling sheets ranging in width from 8 to 17 inches and ranging in length from 10 to 14.33 inches.

C. Sheet Scheduling

1. In General

The present invention involves methods for more efficiently scheduling sheets for insertion into, imaging, and outputting from the duplex paper path loop for simplex and/or duplex imaging. The present methods make full use of the ability to rearrange the order of presentation of sheets to the duplex paper path which is made available with electronic scanning systems due to the ability of these systems to scan documents and store data relating to the information contained on these documents in a memory. Thus, the present scheduling methods are usable in any system which stores at least part of a job or jobs to be printed prior to starting the printing of the job(s).

Since presently available printers are able to print sheets at a much higher rate than presently available scanners are able to read documents, it is not uncommon to scan and store the data representative of the information contained on a plurality of sheets prior to beginning to print copies of the originally scanned sheets. One process for doing this is known as "Stream Printing" and involves starting to print a job prior to completing the scanning of the job (i.e., starting to print at a time during scanning) which optimizes the overlap of scanning and printing while constantly maintaining an image to be printed available for the printer so that no skips are required to be inserted into the printing schedule. In other words, since the printer cannot start printing an image on a sheet until the entire document page containing the image has been scanned, stream printing optimizes the time at which printing of a job begins during scanning so that the printer will never have to pause to wait for a document sheet to be scanned, and the last sheet of the document (or job) will be completely scanned and stored in memory just prior to starting to print the image corresponding to this last document sheet. For more details on Stream Printing, see U.S. Pat. application Ser. No. 07/543,031, entitled "Method And Apparatus For Stream Printing In An Electronic Reprographic Device", filed June 25, 1990 to Alfred L. Bertoni et al, as well as its Continuation-In-Part application Ser. No. 07/589,532 to the same inventors having the same title filed concurrently with the present application.

Additionally, it is also common to scan all of the sheets in a document and store the data representative of the information contained on all of these sheets prior to beginning printing of one or more copies of the document. For example, after storage of the entire document, an operator may desire to view and alter the contents of each sheet with User Interface 52.

In the present description, a set is, for example, a document or multiple documents which belong together. For example, each of the pages in one chapter of a book can be considered to be a set (or a document) because all pages in the chapter belong together. Similarly, a book made from multiple chapters (or documents) can also be considered a set since all of the pages in all of the chapters belong together. A job is equal to one or more identical output sets. For example, a job can consist of printing one copy of a book (a set) or multiple copies of a book (here the job would consist of multiple sets). Multiple jobs can also be printed (e.g., job 1 = three copies of chapter 2 (3 sets); job 2 five copies of chapter 10 (5 sets); etc.).

The present invention makes use of the ability of imaging systems (such as shown in FIGS. 1–8) to store in memory data representing information required to mark multiple sheets (containing the same or different images). Thus, the present printer is operable in what is known as "Burst Mode" printing wherein data representing plural sets or jobs is available to the printer at essentially the same time.

Thus, a user of the printer system 2 may frequently present this system with a series of pre-recorded sheets and/or documents stored on, for example, a disc which he desires to be printed one or more times. The present invention efficiently presents the data representative of each sheet in one or more jobs to be printed to the duplex paper path loop so that few, if any, skipped pitches are placed in the duplex paper path loop. As used in the present description, a skipped pitch is a gap between sheets in the duplex paper path loop which is large enough to contain a sheet. Since many commercial users of the present invention may make up to one million copies per month, any improvements in the efficiency of operation achieved by the present invention will increase productivity by a significant and noticeable amount. Additionally, since many paper path components (e.g., sheet feeding rollers and belts) are continuously operated during printing regardless of the presence of sheets in the paper path, maintaining the paper path filled (no skipped pitches) increases the number of prints which can be made prior to replacing these components due to wear.

Since the present imaging system includes an endless duplex paper path loop without a buffering tray, each set of each job to be printed is initially electronically divided into batches of plural page images per batch, with the number of page images per batch corresponding to the copy sheet capacity of the duplex path. This dividing is similar to what is disclosed in the above-referenced and incorporated U.S. Pat. No. 4,918,490 to Stemmle. The present invention goes beyond the invention disclosed in the above Stemmle patent by further optimizing imaging efficiency, is applicable regardless of the duplex paper path capacity, and specifically addresses intermixed duplex and simplex sheets.

The control of all machine functions, including all sheet feeding, is, conventionally, by a machine controller. The controller is preferably a known programmable microprocessor system, as exemplified by extensive prior art, e.g., U.S. Pat. No. 4,475,156 and its references. Plural but interconnecting microprocessors may also be used at different locations. The controller conventionally controls all the machine steps and functions described herein, and others, including the operation of the document feeder, all the document and copy sheet deflectors or gates, the sheet feeder drives, the finisher 120, etc. As further taught in the references, the copier controller also conventionally provides for storage and comparison of the counts of the copy sheets, the number of documents recirculated in a document set, the desired number of copy sets and other selections and controls by the operator through the console or other panel of switches connected to the controller, etc. The controller is also programmed for time delays, jam correction, etc. Conventional path sensors or switches may be utilized to help keep track of the position of the documents and the copy sheets and the moving components of the apparatus by connection to the controller. In addition, the controller variably regulates the various positions of the gates depending upon which mode of operation is selected.

The controllers which control the sheet scheduling described in the present application are Image Output Control 60 and EDN Core 130 of FIGS. 2 and 6, respectively. The majority of the sheet scheduling functions are performed by the EDN Core 130. The Image Output 60 is responsible for converting simplex sheets to duplex with blank back sides (to be described below). The reason for this difference in responsibility is that the controller 7 needs to know the 'plex of all sheets to prepare the images correctly. Of course, other controller structures are possible depending on the hardware and software used to implement the present invention.

The present invention can be used to increase the efficiency of copy sheet imaging regardless of whether the sheets are imaged in 1-N or N-1 order. With conventional copiers which, for example, image sheets as they are fed through, for example, an RDH, if an original simplex document was fed in N-1 order, duplex imaging could not begin until the entire document was fed through the RDH once so that the number of pages in a simplex document being copied in duplex form could be determined. This is because if an odd number of pages existed in the document being copied, the last sheet in the duplex copy of this document would be a simplex sheet having an image on only one side of its respective sheet. Since imaging was being conducted in N-1 order, the system could not determine whether the first sheet to be printed (which would be the last chronological sheet in the set) should be simplex or duplex. With the present invention, as with other conventional systems which utilize electronic scanners and thus are able to store data representative of the information contained on each sheet of a document prior to starting printing, the system will know whether each sheet in the set to be copied needs to be simplex or duplex based upon information which is also stored in memory. Thus, the data representing the information contained on original documents is initially presented to the scheduler (the controller which controls the scheduling functions of the present invention is hereinafter referred to as a "scheduler" so as to distinguish it from other controllers in the system) of the present invention in a manner which indicates, for each sheet of each set to be printed, whether the sheet is to be simplex or duplex imaged, and the appropriate image to be placed on the respective side(s) of each sheet. The chronological order of the information is usually 1-N or N-1, although the scheduler (which performs the scheduling methods of the present invention) need not know this since the controller (which is arranged higher in the system control hierarchy and controls the entire imaging and sheet outputting process) controls the orientation and final destination of each sheet outputted from the duplex paper path based upon information also provided to the controller. Additional information provided to the controller includes the number of copies of each set to be marked as well as the number of sets in each job and the number and order of jobs to be marked.

When multiple copies of a set or document are to be imaged, the printer can be controlled to consecutively image multiple copies of the set or document (in which case the output from the duplex paper path will be collated and each copy of the set or document can be stacked upon each other or directed to different output trays) or the printer can operate in a multiple imaging mode. In the multiple imaging mode, the printer functions to consecutively image multiple copies of each page of the set or document to be copied plural times. For example, if three copies of a document were required and the document was to be printed in 1-N order, three consecutive sheets would receive the page image, followed by the next three sheets receiving the page 3 image, etc. until the duplex paper path is filled to its capacity M. Upon being recirculated back to the imaging station, each sheet would then have the appropriate side 2 image placed on the side opposite from that receiving the side 1 image. Prior to performing the scheduling methods of the present invention, the upper hierarchy controller would determine an initial sheet presentation order (i.e., in the present example, three duplex sheets to receive the page 1 and 2 images, followed by 3 sheets to receive the page 3 and 4 images, etc. up to page N). When operating in the multiple-imaging mode, the output from the duplex paper path is not collated. As such, collation of the final output copies of the set or document is achieved using, for example, a bindexer such as disclosed in the above cited and incorporated U.S. Pat. No. 4,782,363. While this bindexer type of post collator is only capable of post collating a small number of sets, the present invention is also usable with copiers or printers which include a large number of output bins (e.g., 10 or 20 output bins).

Thus, it is seen how the actual content of each copy sheet to be imaged is not considered by the scheduling methods and algorithms of the present invention. The ordering of the actual content of each copy sheet to be printed is determined by other copy system control methods and algorithms. A stream of consecutive sheets to be printed, wherein each sheet is identified as being either simplex or duplex with, for example, software pointers indicating the file location of the image information to be printed on each side of the sheet, is presented to the sheet scheduler of the present invention. The present scheduler then determines when and where to insert each copy sheet into the duplex paper path so that the printing operation will proceed as efficiently as possible, i.e., with the minimum amount of skipped pitches, while still outputting the sheets in the same order which they were originally presented to the scheduler if necessary. Generally, it is not desirable to rearrange the order of printing of the same type of sheet (duplex or simplex) within the same set because the previously determined output order of the sheets will be disturbed. However, the arrangement of sheets having different final destinations (sheets in different sets may have different final destinations) can be made even if the rearrangement results in completion of printing of the sheets in a different order than was previously determined because the output order of each sheet within its own set will not be disturbed.

It is also understood that the present invention can be used in printing systems which are also capable of printing in multiple colors or which use "highlight coloring" wherein images are printed in both red and black colors on the same sheet. Multiple color printing or highlight coloring can be performed by printing both colors on each sheet at the same time or by scheduling separate passes of each sheet by the imaging station for each separate color. In the case where separate passes are required for each color, the disclosed methods and algorithms must be modified slightly in a manner which can be determined by one of ordinary skill in the art based on this disclosure to provide for more than two passes of a duplex sheet through the duplex loop or more than one pass of each sheet for simplex printing.

2. Burst Mode Scheduling Regardless of Set or Job Boundaries

Figure 9:
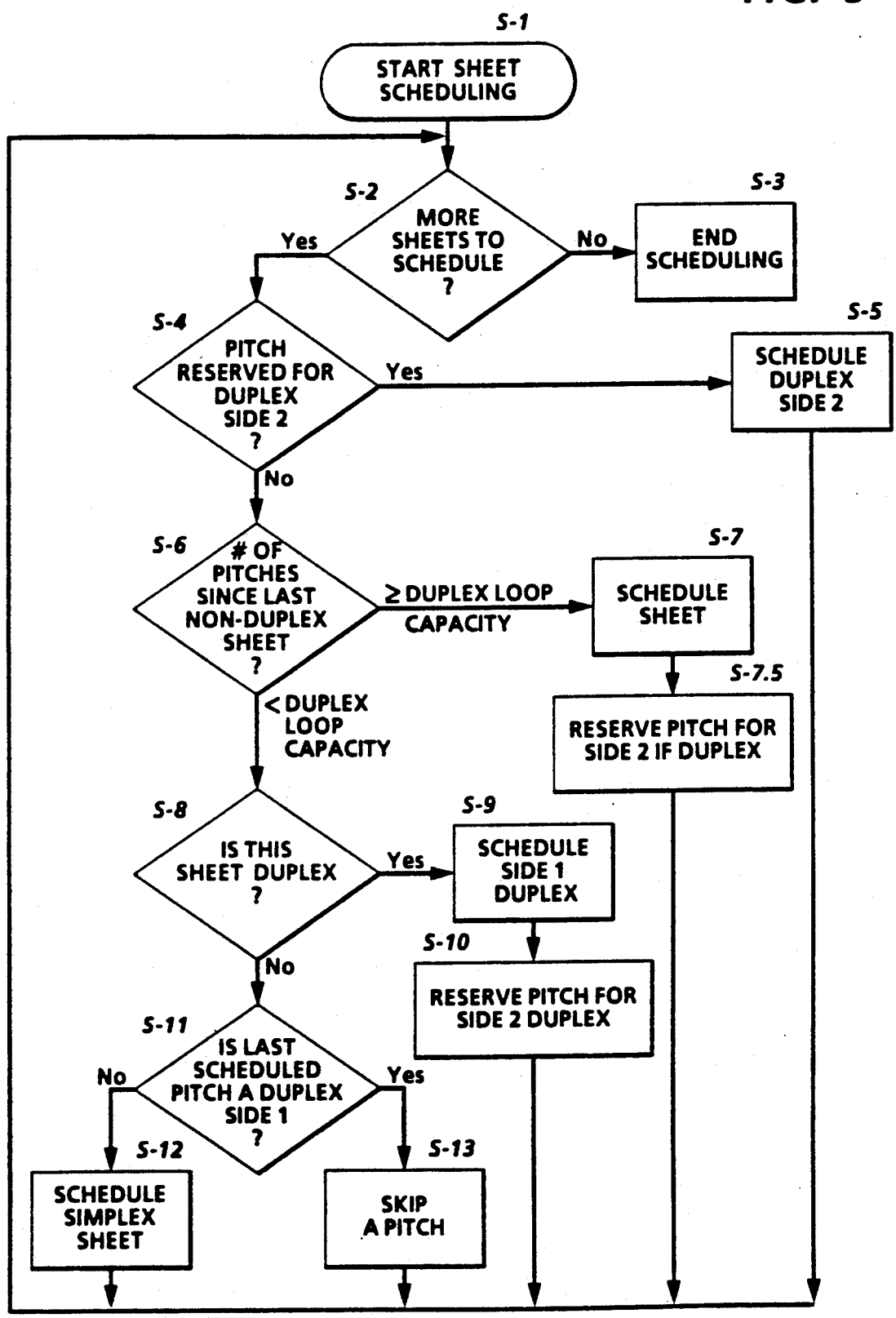
FIG. 9 is a flowchart illustrating conceptually the procedure of a controller for filling a duplex paper path loop to capacity regardless of set or job boundaries.

FIG. 9 is a flowchart illustrating conceptually the procedures of a controller for filling a duplex paper path loop to capacity regardless of set or job boundaries or the type of sheet (simplex or duplex) for being printed. The procedures illustrated in FIG. 9 control the scheduling (i.e., the insertion of sheets into the duplex paper path loop) while eliminating as many skipped pitches as possible without disturbing the output order of sheets from the loop. The procedure illustrated in FIG. 9 achieves this result by scheduling the sheets and images to be printed on each sheet for being passed through the duplex loop so that the duplex path is filled to capacity, if possible, with sheets. In the example illustrated in the drawings, the capacity, M, of the duplex paper path loop is eight sheets (also known as eight pitches). However, the present invention is applicable to a paper path having other capacities. In fact, since the size of the sheets which are inserted into the paper path loop can vary, the same paper path loop is capable of holding different numbers of sheets depending on the size of the sheets. Of course, it is also possible to select a fixed duplex loop capacity regardless of paper size as long as the selected capacity is small enough to provide a sufficient intersheet gap for controlling sheet flow (e.g., for insertion of gates between sheets). After the sheets are inserted into the paper path loop, they are printed with a loop or conveyed back around the paper path loop for side two imaging. Prior to being conveyed past the imaging station 106 a second time, each sheet which is to be duplex printed is inverted by inverter 170 so that the side of the sheet opposite from the side containing the first image is conveyed by imaging station 106 for receiving a side two image on its second side. Each sheet is then output from the duplex paper path loop and conveyed to finisher 120. After the simplex or duplex sheet is output from the duplex paper path loop, its previous location or pitch in the stream of sheets remaining in the duplex paper path loop is filled with a subsequent sheet to be printed.

The present invention functions to continuously fill the duplex paper path loop with subsequent sheets whenever a pitch in the paper path loop adjacent the appropriate insertion station is empty regardless of the set or job from which the subsequent sheet is obtained. Previous systems which function to insert consecutive sheets into the duplex paper path loop without providing gaps between each consecutive sheet, schedule the sheets in a manner which results in skipped pitches existing in the duplex paper path loop sheet schedule between the side one imaging and side two imaging of the last sheets in the set or job being printed if the number of sheets in the set or job is not an integer multiple of the duplex loop capacity. An example of interset duplex burst mode scheduling in which sheets from a set are inserted into the duplex paper path loop for imaging prior to side two imaging is performed on duplex sheets from a previous set is illustrated below:

| INTERSET DUPLEX BURST MODE SCHEDULING EXAMPLE | | | |
|---|---|---|---|
| Pitch | Set | Sheet | Side |
| 1 | 1 | 1 | 1 |
| 2 | 1 | 2 | 1 |
| 3 | 1 | 3 | 1 |
| 4 | 2 | 1 | 1 |
| 5 | 2 | 2 | 1 |
| 6 | 2 | 3 | 1 |
| 7 | 3 | 1 | 1 |
| 8 | 3 | 2 | 1 |
| 9 | 1 | 1 | 2 |
| 10 | 1 | 2 | 2 |
| 11 | 1 | 3 | 2 |
| 12 | 2 | 1 | 2 |
| 13 | 2 | 2 | 2 |
| 14 | 2 | 3 | 2 |
| 15 | 3 | 1 | 2 |
| 16 | 3 | 2 | 2 |
| 17 | 3 | 3 | 1 |
| 18 | 4 | 1 | 1 |
| 19 | 4 | 2 | 1 |
| 20 | 4 | 3 | 1 |
| 21 | 5 | 1 | 1 |
| 22 | 5 | 2 | 1 |
| 23 | 5 | 3 | 1 |
| 24 | 6 | 1 | 1 |

The above example is for a duplex loop having an eight sheet capacity (M=8). The example job includes at least six sheets, each set containing 3 duplex sheets.

Similarly, the scheduling of sheets into the duplex paper path loop for advanced job streaming duplex burst mode, wherein sheets from a subsequent job are scheduled and inserted into the duplex paper path loop for side one imaging prior to performing side two imaging on at least some of the duplex sheets from a preceding job, is illustrated below:

| ADVANCED JOB STREAMING DUPLEX BURST MODE SCHEDULING EXAMPLE | | | | |
|---|---|---|---|---|
| Pitch | Job | Set | Sheet | Side |
| 1 | 1 | 1 | 1 | 1 |
| 2 | 1 | 1 | 2 | 1 |
| 3 | 1 | 1 | 3 | 1 |
| 4 | 1 | 2 | 1 | 1 |
| 5 | 1 | 2 | 2 | 1 |
| 6 | 1 | 2 | 3 | 1 |
| 7 | 2 | 1 | 1 | 1 |
| 8 | 2 | 1 | 2 | 1 |
| 9 | 1 | 1 | 1 | 1 |
| 10 | 1 | 1 | 2 | 2 |
| 11 | 1 | 1 | 3 | 2 |
| 12 | 1 | 2 | 1 | 2 |

ADVANCED JOB STREAMING DUPLEX BURST MODE SCHEDULING EXAMPLE (continued)

| Pitch | Job | Set | Sheet | Side |
|---|---|---|---|---|
| 13 | 1 | 2 | 2 | 2 |
| 14 | 1 | 2 | 3 | 2 |
| 15 | 2 | 1 | 1 | 2 |
| 16 | 2 | 1 | 2 | 2 |
| 17 | 2 | 2 | 1 | 1 |
| 18 | 2 | 2 | 2 | 1 |
| 19 | 3 | 1 | 1 | 1 |
| 20 | 3 | 1 | 2 | 1 |
| 21 | 3 | 1 | 3 | 1 |
| 22 | 3 | 1 | 4 | 1 |
| 23 | 3 | 1 | 5 | 1 |
| 24 | 3 | 1 | 6 | 1 |

The above example is for a duplex loop having an eight sheet capacity (M=8). The example includes: a first job comprising two sets, each set having three duplex sheets; a second job comprising two sets, each set having two duplex sheets; and a third job comprising at least one set having six duplex sheets.

The flowchart of FIG. 9 illustrates one preferred set of procedures for scheduling sheets for interset duplex burst mode scheduling or advanced job streaming duplex burst mode scheduling. In step S-1, the scheduling procedure begins. In step S-2, a determination is made as to whether any additional sheets are present at the insertion station for being inserted into and scheduled for printing in the duplex paper path loop. If no sheets exist, the scheduling ends in step S-3. If sheets do exist, the scheduling procedure proceeds to step S-4 where it is determined whether the pitch adjacent the insertion station has been reserved for receiving a side two image. In other words, at step S-4, a determination is made as to whether a sheet exists in the pitch adjacent the insertion station, which sheet is to receive a side two image. If the pitch is reserved for receiving a duplex side two image, the procedure proceeds to step S-5 where the side two image is scheduled for being imaged onto the sheet already existing in the duplex paper path loop. If the pitch is not reserved, a determination is made in step S-6 as to the number of pitches which have passed the insertion station since the last non-duplex sheet was scheduled. In this procedure, a "non-duplex sheet" is either a simplex sheet or a duplex side 2 image. If the number determined in step S-6 is greater than or equal to the duplex paper path loop capacity, M, the procedure proceeds to step S-7 and S-7.5 where the sheet is scheduled. That is, in the present example, if eight or more pitches have passed the insertion station since a duplex sheet was inserted into the duplex paper path loop, the next available previously unscheduled sheet is scheduled for printing in the duplex paper path loop regardless of whether it is simplex or duplex. This can be done because a determination that eight or more pitches have passed the insertion station means that either the previous eight sheets were all simplex and/or duplex side two images, and thus the duplex paper path loop is empty in the present example. An empty duplex paper path loop is one in which no pitches between the imaging station 106 and insertion station (in a clockwise direction) are reserved for receiving duplex side two images and no pitches between the insertion station and imaging station 106 (in a clockwise direction) are reserved for duplex side one images. Of course, the insertion station can be any of the areas adjacent feed trays 110, 112 or 114.

If the number determined in step S-6 is less than the duplex paper path loop capacity, M, a duplex side one image has been scheduled in the duplex paper path loop and its pitch which is reserved for receiving the side two image has not yet passed the insertion station. As such, it would not be desirable to place a simplex sheet into the duplex paper path loop unless the previously scheduled sheet was a simplex sheet. Thus, in step S-8 a determination is made as to whether the next available unscheduled sheet is duplex and if it is duplex, the sheet is scheduled for side one imaging and the corresponding pitch is reserved for side two imaging in steps S-9 and S-10. If the next available unscheduled sheet is simplex, the procedure proceeds to step S-11 where a determination is made as to whether the previously scheduled sheet was a duplex side one. If the last scheduled pitch was a duplex side two or simplex, the procedure proceeds to step S-12 where the simplex sheet is scheduled and inserted into the duplex paper path. If the previously scheduled pitch was for a duplex side one, the procedure proceeds to step S-13 and a pitch is skipped. This pitch must be skipped because if it were filled with the simplex sheet, the printing of the simplex sheet would be completed prior to the side two imaging of the previously scheduled duplex sheet, and thus the simplex sheet would be output from the paper path loop out of order with the duplex sheet.

3. Converting Simplex Sheets to Duplex With Blank Back Sides

As can be realized from the description of the control procedure illustrated in FIG. 9, skipped pitches will result in the sheet scheduling when a simplex sheet follows a duplex side one sheet which does not complete filling of the duplex paper path loop. Situations exist where it would be beneficial to insert the simplex sheet into the paper path loop even if the preceding sheet was a duplex side one image which did not fill the duplex paper path loop. For example, when the document(s) include(s) a series of duplex sheets followed by a single simplex sheet and then more duplex sheets which are to be maintained in that order and have the same final destination, it would be undesirable to wait until the duplex paper path loop has emptied prior to scheduling the simplex sheet. In this situation, if the simplex sheet were converted to a duplex sheet having a blank second side, it could be inserted into the duplex paper path loop immediately after the previously scheduled duplex side one sheet and recirculated through the loop but have a blank image "printed" on one of its sides so that the duplex sheets following the simplex sheet could be immediately scheduled. Thus, situations arise where a set or job or combination of sets or jobs results in intermixed simplex and duplex sheets, and it is desirable to convert one or more of the simplex sheets to a duplex sheet so that the scheduling will proceed in a more efficient manner. An example of the benefits achieved by converting a simplex sheet to a duplex sheet with a blank backside when a job comprising four duplex sheets, one simplex sheet and then 10 duplex sheets are printed in the eight pitch duplex loop of FIGS. 3 and 8 is illustrated below:

Intermixed Simplex/Duplex Sheet Example

| | without Duplex Conversion | | | with Duplex Conversion | | |
|---|---|---|---|---|---|---|
| Pitch | Sheet | Side | 'Plex | Sheet | Side | 'Plex |
| 1 | 1 | 1 | Duplex | 1 | 1 | Duplex |

-continued

Intermixed Simplex/Duplex Sheet Example

| | without Duplex Conversion | | | with Duplex Conversion | | |
|---|---|---|---|---|---|---|
| Pitch | Sheet | Side | 'Plex | Sheet | Side | 'Plex |
| 2 | 2 | 1 | Duplex | 2 | 1 | Duplex |
| 3 | 3 | 1 | Duplex | 3 | 1 | Duplex |
| 4 | 4 | 1 | Duplex | 4 | 1 | Duplex |
| 5 | Duplex | Loop | Skip | 5 | 1 | Duplex |
| 6 | Duplex | Loop | Skip | 6 | 1 | Duplex |
| 7 | Duplex | Loop | Skip | 7 | 1 | Duplex |
| 8 | Duplex | Loop | Skip | 8 | 1 | Duplex |
| 9 | 1 | 2 | Duplex | 1 | 2 | Duplex |
| 10 | 2 | 2 | Duplex | 2 | 2 | Duplex |
| 11 | 3 | 2 | Duplex | 3 | 2 | Duplex |
| 12 | 4 | 2 | Duplex | 4 | 2 | Duplex |
| 13 | Inverter | Skip | | 5 | 2 | Duplex |
| 14 | 5 | 1 | Simplex | 6 | 2 | Duplex |
| 15 | 6 | 1 | Duplex | 7 | 2 | Duplex |
| 16 | 7 | 1 | Duplex | 8 | 2 | Duplex |
| 17 | 8 | 1 | Duplex | 9 | 1 | Duplex |
| 18 | 9 | 1 | Duplex | 10 | 1 | Duplex |
| 19 | 10 | 1 | Duplex | 11 | 1 | Duplex |
| 20 | 11 | 1 | Duplex | 12 | 1 | Duplex |
| 21 | 12 | 1 | Duplex | 13 | 1 | Duplex |
| 22 | 13 | 1 | Duplex | 14 | 1 | Duplex |

Even though the conversion of a simplex sheet to a duplex sheet having a blank back essentially results in a skipped pitch (that is, "printing" a blank image is equivalent to a skipped pitch), the total number of pitches which are skipped in the entire job is greatly reduced because the duplex sheets which follow the previously simplex sheet can be scheduled for imaging much sooner than they would have been scheduled had no conversion taken place. Additionally, the inverter skip is not required.

The inverter skip is required in situations where a transition occurs in the sheets output from the duplex paper path, from sheets which must be inverted by a finisher-inverter 176 (see FIG. 3) to sheets which are not inverted by finisher-inverter 176. Such a situation exists when output changes from duplex sheets (which usually must be inverted by finisher-inverter 176) to simplex sheets (which are usually not required to be inverted by finisher-inverter 176). That is, the finisher-inverter subsystem cannot transition from an inverted sheet to a non-inverted sheet within the normal inter-sheet timing gap without creating a sheet collision. Thus, if normal sheet scheduling does not provide at least one skip pitch between an inverted sheet and a non-inverted sheet (the primary goal of the present invention), the scheduler needs to provide an inverter skip pitch at this transition. An inverter skip pitch is the same duration as any other skip pitch, it is simply a skip pitch dedicated to preventing sheet overlap in the finisher-inverter. When running in an N to 1 scheduling mode, typically duplex sheets are inverted by finisher-inverted 176 but simplex sheets are not inverted.

The finisher-inverter subsystem can invert sheets at the printer's full output rate (e.g., 137 prints per minute) during steady state operation. The finisher-inverter 176 is a reversing roll type inverter, similar in concept to duplex paper path inverter 170, which effectively increases the paper path length for inverted sheets. Thus, a transition from inverted to non-inverted sheets shortens the effective paper length thereby shortening the distance between an inverted sheet and a trailing non-inverted sheet. In the case of the finisher-inverter, the intersheet gap is shortened so much that sheet overlap (sheet collision) would occur if an inverted to non-inverted transition were permitted without a one pitch interval between sheet arrivals. However, situations can arise when no inverter skip is required if for example a transition from duplex to simplex does not require a change in operation of finisher-inverter 176 (e.g., all simplex and duplex sheets are either inverted or not inverted by finisher-inverter 176).

Figure 10:
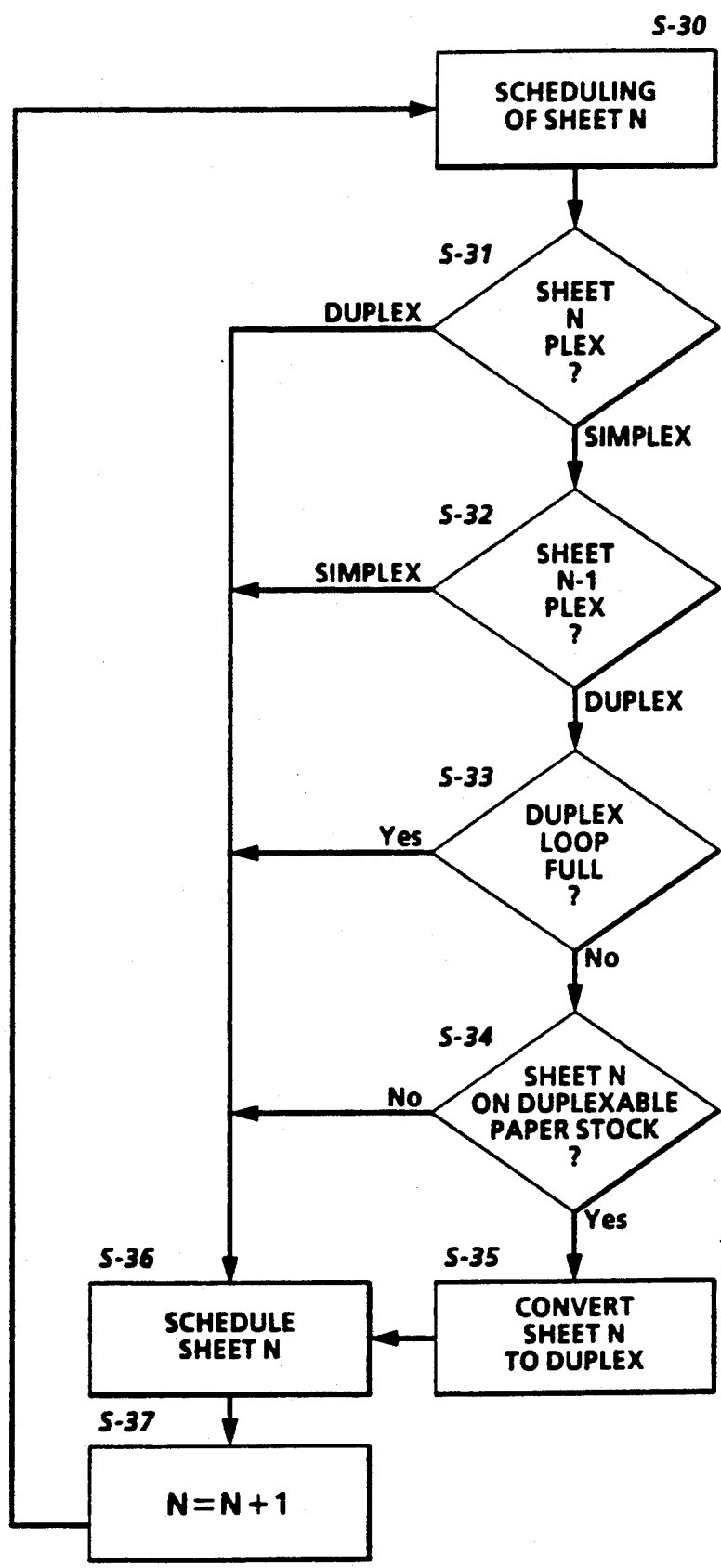
FIG. 10 is a flowchart illustrating conceptually the procedures of a controller for converting simplex sheets to duplex sheets having blank back sides if necessary to prevent skipped pitches.

A procedure for converting a simplex sheet to a duplex sheet is illustrated in FIG. 10. In step S-30, the scheduling of a sheet, sheet N, is initiated. However prior to scheduling sheet N, steps S-31 through S-35 take place to determine whether and if sheet N needs to be, and can be converted to a duplex sheet having a blank second side. In step S-31, a determination is made as to whether the sheet is simplex or duplex. If the sheet is duplex, it is scheduled in step S-36. If the sheet is simplex, in step S-32 a determination is made as to the 'plex of the previous (N-1) sheet. If the previous sheet was simplex, the current simplex sheet is scheduled as simplex. The current sheet can be scheduled as simplex because it will not disturb the output order of sheets since the previously scheduled sheet was also simplex and will therefor exit the duplex paper path loop just prior to the current (N) simplex sheet. If in step S-32, the previous sheet was duplex, a determination is made in step S-33 as to whether the duplex loop is full. If the duplex loop is full, the current sheet can be scheduled as simplex in step S-36 because it will not disturb the output order of sheets from the duplex paper path. If the duplex paper path loop is not full, the sheet is converted to a duplex sheet in step S-35, but preferably only if the current sheet (N) is s to be printed on duplexable paper stock S-34. Although step S-34 can be left out, the risk of inverter jams increases. After scheduling sheet N in step S-36, the value of N is incremented in step S-37, and the procedure is performed for the next sheet.

The use of the terminology "scheduling" in FIG. 10 is a misnomer since the procedure of FIG. 10 need not be used to schedule sheets but can be used prior to scheduling the sheets to convert simplex sheets to duplex sheets with blank back sides, if necessary, prior to scheduling all of the sheets. In other words, prior to performing the procedure of FIG. 9, the procedure of FIG. 10 would be performed to convert simplex sheets to duplex sheets with blank backsides, if necessary, to increase the efficiency of the scheduling procedure if possible. It is not always possible to convert a sheet scheduled for simplex imaging to duplex imaging because the type of sheet onto which the simplex image is to be printed may not be capable of being passed through the inverter 170. Examples of such non-duplexable paper stock include some prepunched stocks (depending on printer paper path characteristics), transparencies (specifically, transparencies which have no backing sheet and which have an opaque lead edge), and tab stock. As an alternative to the procedure illustrated in FIG. 10, steps S-33, S-34, S-35 and S-36 can be substituted for step S-13 in FIG. 9 so that instead of skipping a pitch, the simplex sheet is converted to a duplex sheet if possible.

Thus, the present invention provides specific criteria and procedures for converting simplex sheets to duplex sheets regardless of the location of the simplex sheet(s) with a copy set and is particularly useful when the simplex sheet(s) is located at a position intermediate the copy set (i.e., the simplex sheet(s) is not a first or last sheet in the copy set).

4. Adaptive Duplex Scheduling to Detect and Fill Unexpected Gaps

Situations also arise where, for some previously unexpected reason, a skipped pitch or gap is placed in the order of sheets that have been inserted into the duplex paper path loop. As explained above, when printing duplex sheets in burst mode, no skipped pitches or gaps are scheduled in the duplex paper path stream. Unexpected gaps can arise when, in the scheduling of sheets for side one imaging in the duplex paper path loop, there is a skip request from one of the components in the printing system. Skip requests result from, for example, the paper path when a sheet of paper is not ready to be inserted into the duplex paper path loop at the desired pitch, the xerographic control system, or the Input Output Terminal when the IOT is informed that an image is not ready (i.e., when attempting to insert a sheet into the duplex paper path, the image to be placed upon that sheet has not been found or fully retrieved from memory—this can occur when the graphics in the image is very complex). Normally, this requested skip would show up in the side two sheet stream and is referred to as the back side of the skip request or an unexpected gap. The present invention is capable of monitoring the insertion of sheets into the duplex paper path loop and determining whether and where any unscheduled sheet gaps exist between sheets in the duplex paper path loop. The determination can be made when the skip request is issued or by sensing gaps in a stream of duplex sheets which have been printed with a side one image as they pass the insertion station. The present invention modifies the scheduling so that the unexpected gap which exists between the duplex sheets printed with a side one image is filled when the gap passes by the insertion station by inserting and scheduling the next available sheet for side one imaging in the unexpected gap.

This procedure is also known as one type of adaptive duplex scheduling. The advantages of adaptive duplex scheduling over regular burst mode duplex scheduling using an example containing a series of duplex sheets inserted into an eight pitch duplex loop is shown below:

| | Burst Mode Duplex Scheduling | | | |
|---|---|---|---|---|
| | without Adaptive Scheduling | | with Adaptive Scheduling | |
| Pitch | Sheet | Side | Sheet | Side |
| 1 | 1 | 1 | 1 | 1 |
| 2 | 2 | 1 | 2 | 1 |
| 3 | Skip Request #1 | | Skip Request #1 | |
| 4 | 3 | 1 | 3 | 1 |
| 5 | 4 | 1 | 4 | 1 |
| 6 | 5 | 1 | 5 | 1 |
| 7 | Skip Request #2 | | Skip Request #2 | |
| 8 | 6 | 1 | 6 | 1 |
| 9 | 1 | 2 | 1 | 2 |
| 10 | 2 | 2 | 2 | 2 |
| 11 | Back of skip #1 | | 7 | 1 |
| 12 | 3 | 2 | 3 | 2 |
| 13 | 4 | 2 | 4 | 2 |
| 14 | 5 | 2 | 5 | 2 |
| 15 | Back of skip #2 | | 8 | 1 |
| 16 | 6 | 2 | 6 | 2 |
| 17 | 7 | 1 | 9 | 1 |
| 18 | Skip Request #3 | | Skip Request #3 | |
| 19 | 8 | 1 | 7 | 2 |
| 20 | 9 | 1 | 10 | 1 |
| 21 | 10 | 1 | 11 | 1 |
| 22 | 11 | 1 | 12 | 1 |
| 23 | 12 | 1 | 8 | 2 |
| 24 | 13 | 1 | 13 | 1 |

It is understood that since burst mode duplex scheduling is insensitive to set or job boundaries, the sheets in the above example can be located in more than one set or job. Although the above example illustrates the use of adaptive duplex scheduling for only duplex sheets, it can also be used with a series of duplex sheets which include one or more simplex sheets interspersed therein. The simplex sheets can be inserted into the unexpected, unscheduled gaps whenever the simplex sheet is being routed to a final destination which is different than the duplex sheet following it.

Figure 11:
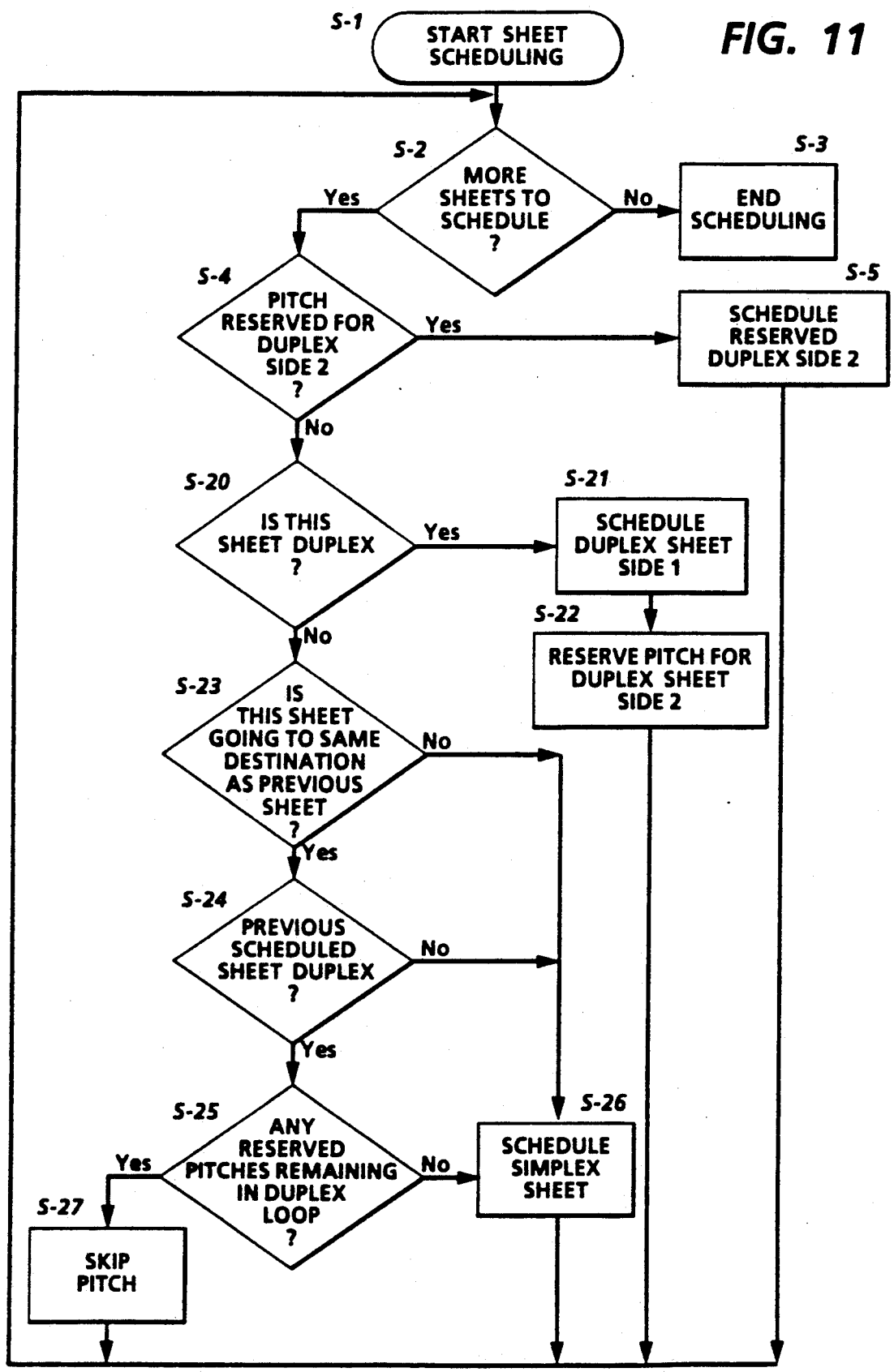
FIG. 11 is a flowchart illustrating conceptually the procedures of a controller for filling unexpected sheet gaps in a duplex side two sheet stream.

FIG. 11 is a flow chart illustrating conceptually the procedures of a controller for filling unexpected sheet gaps in a duplex side two sheet stream. Steps S-1 through S-5 are the same as in FIG. 9. If in step S-4 the pitch which is located adjacent the insertion station is not reserved for a duplex side two image, the procedure proceeds to step S-20 where a determination is made as to whether this unscheduled sheet is simplex or duplex. If the sheet is duplex, it is scheduled for side one imaging and the appropriate pitch is reserved for receiving the duplex sheet side two image in steps S-21 and S-22. If the sheet is determined to be simplex in step S-20, a series of determinations are made in steps S-23 through S-25 which will determine whether this sheet can be scheduled in the unexpected sheet gap or if the pitch must be skipped. The next available sheet will be scheduled in step S-26 for side one imaging unless it has a final destination which is the same as the immediately previously scheduled sheet, the immediately previously scheduled sheet is duplex, and pitches which are reserved for receiving duplex side two images exist in the duplex paper path loop. If any of the above-recited situations do not exist, the sheet can be scheduled in the unexpected sheet gap without disrupting the order of outputting of sheets from the duplex paper path loop.

5. Adaptive Scheduling at Simplex-to-Duplex Transitions

Another method for increasing the efficiency of printing with a printer having an endless duplex paper path loop without a buffer tray involves selectively altering the sheet scheduling sequence at simplex-to-duplex sheet transitions. This productivity improvement is achieved at simplex-to-duplex transitions in the sheet stream to be scheduled by advancing the scheduling of some of the duplex side one sheets ahead of the last simplex sheet(s) to avoid skipping pitches while waiting for the duplex sheets to travel the duplex loop for receiving their side two images. When all of the following conditions are met, some of the duplex side ones should be scheduled prior to the last simplex print:

1) The sheets in the sheet stream preceding the group of contiguous duplex sheets are simplex, i.e. a simplex-to-duplex transition occurs;

2) The number of contiguous duplex sheets following the simplex-to-duplex transition is less than the duplex loop size, M. The number of duplex sheets to be advanced ahead of the last simplex sheet is the maximum of:

A) The number of contiguous duplex sheets; and
B) The size of the duplex loop minus one.

The advanced duplex sheets should be placed ahead of a specific number of simplex sheets. The specific number of simplex sheets is the minimum of:

A) The number of contiguous simplex sheets; and
B) The numerical difference between the duplex paper path loop and the number of duplex side ones which are advanced.

An example of this adaptive scheduling technique versus scheduling without this adaptive technique is illustrated below for a job comprising six simplex sheets followed by four duplex sheets which is then followed by eight simplex sheets in an eight pitch duplex loop:

| Nonsequential Simplex-to-Duplex Transition Example | | | | | |
|---|---|---|---|---|---|
| without Adaptive Scheduling | | | with Adaptive Scheduling | | |
| Pitch | Sheet | Side | 'Plex | Sheet | Side | 'Plex |
| 1 | 1 | 1 | Simplex | 1 | 1 | Simplex |
| 2 | 2 | 1 | Simplex | 2 | 1 | Simplex |
| 3 | 3 | 1 | Simplex | 7 | 1 | Duplex |
| 4 | 4 | 1 | Simplex | 8 | 1 | Duplex |
| 5 | 5 | 1 | Simplex | 9 | 1 | Duplex |
| 6 | 6 | 1 | Simplex | 10 | 1 | Duplex |
| 7 | 7 | 1 | Duplex | 3 | 1 | Simplex |
| 8 | 8 | 1 | Duplex | 4 | 1 | Simplex |
| 9 | 9 | 1 | Duplex | 5 | 1 | Simplex |
| 10 | 10 | 1 | Duplex | 6 | 1 | Simplex |
| 11 | Duplex | Loop | Skip | 7 | 2 | Duplex |
| 12 | Duplex | Loop | Skip | 8 | 2 | Duplex |
| 13 | Duplex | Loop | Skip | 9 | 2 | Duplex |
| 14 | Duplex | Loop | Skip | 10 | 2 | Duplex |
| 15 | 7 | 2 | Duplex | Inverter | Skip | |
| 16 | 8 | 2 | Duplex | 11 | 1 | Simplex |
| 17 | 9 | 2 | Duplex | 12 | 1 | Simplex |
| 18 | 10 | 2 | Duplex | 13 | 1 | Simplex |
| 19 | Inverter | Skip | | 14 | 1 | Simplex |
| 20 | 11 | 1 | Simplex | 15 | 1 | Simplex |
| 21 | 12 | 1 | Simplex | 16 | 1 | Simplex |
| 22 | 13 | 1 | Simplex | 17 | 1 | Simplex |
| 23 | 14 | 1 | Simplex | 18 | 1 | Simplex |

Figure 12:
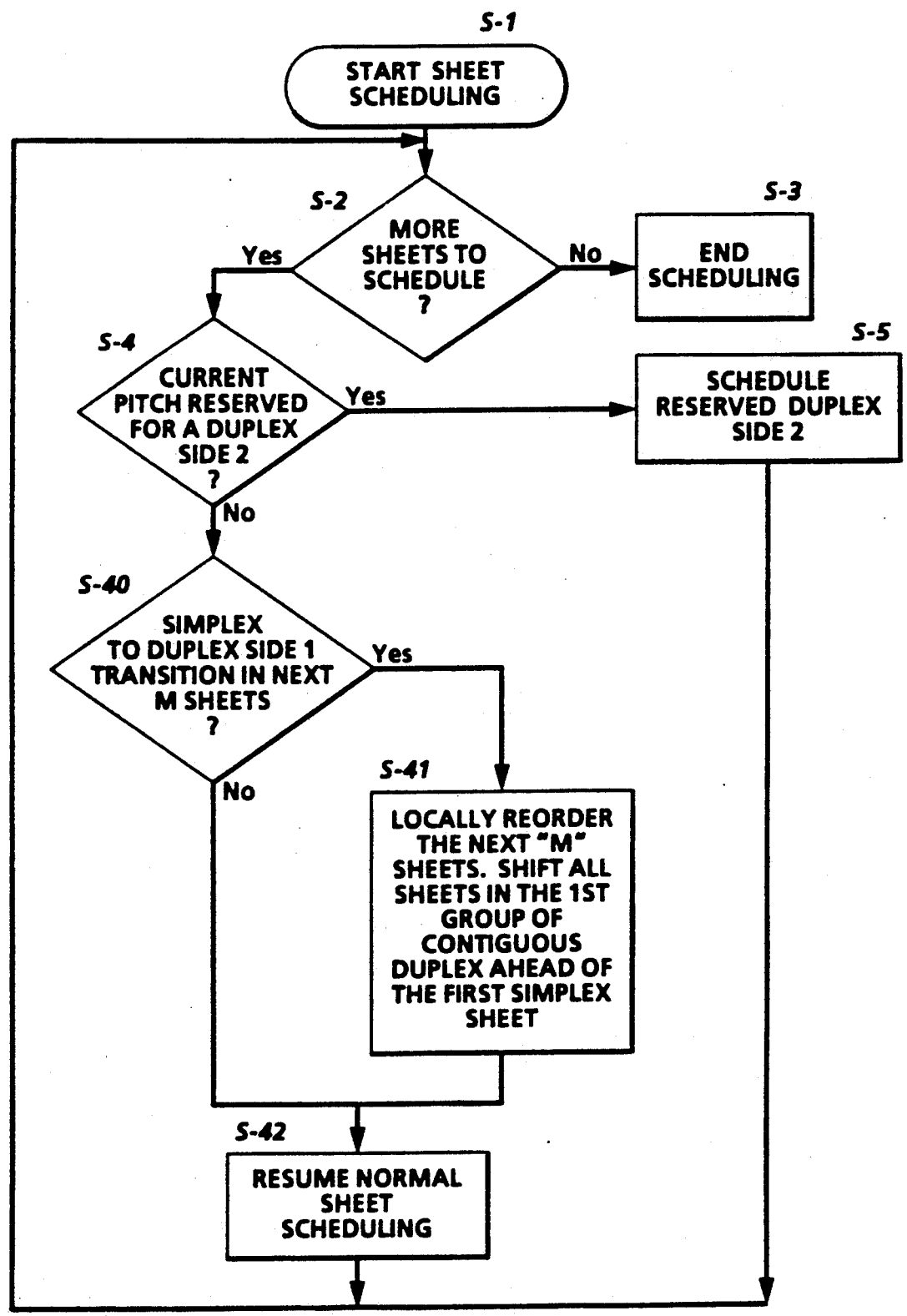
FIGS. 12 and 13 are flowcharts illustrating conceptually alternative procedures of a controller for shifting simplex or duplex sheets at a simplex-to-duplex transition to reduce the number of skipped pitches, if any, in the duplex side one sheet stream.
Figure 13:
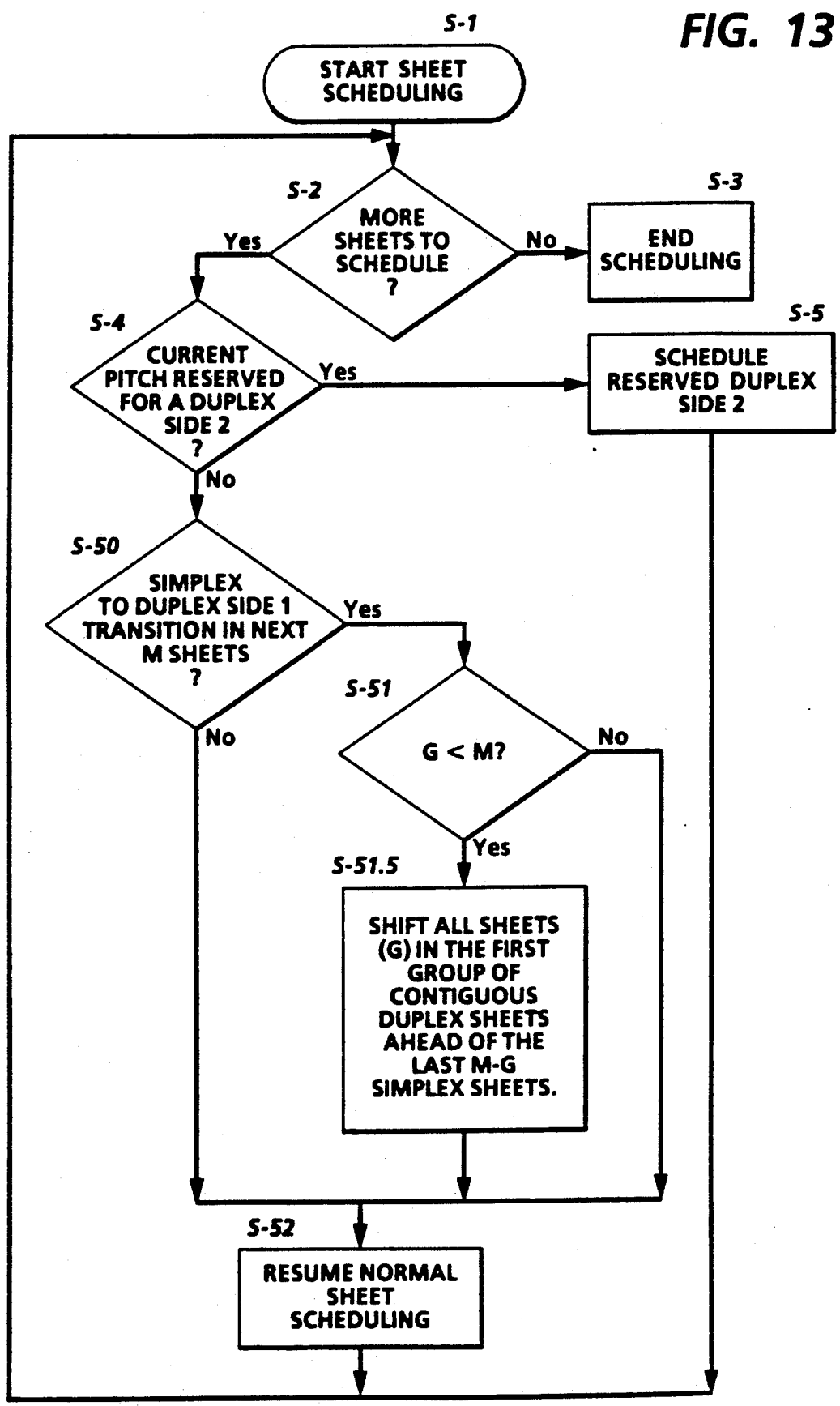

FIGS. 12 and 13 are flow charts illustrating conceptually alternative procedures of a controller for shifting simplex and duplex sheets at a simplex-to-duplex transition to reduce the number of skipped pitches, if any, in the duplex side one sheet stream. In FIG. 12, steps S-1 through S-5 are the same as in FIG. 9. After determining that the pitch located adjacent the insertion station is not reserved for a duplex side two image in step S-4, the procedure proceeds to step S-40. In step S-40, the controller which controls scheduling looks at the next M sheets which are to be scheduled in the duplex paper path loop and determines whether a simplex-to-duplex side one transition occurs in those sheets. If no such transition occurs, the procedure proceeds to step S-42, to be explained below. If in step S-40 a simplex-to-duplex side one transition is detected, in step S-41, the next M number of sheets are locally reordered. This reordering includes shifting all sheets in a first subgroup of contiguous duplex sheets within the group of M sheets ahead of a first simplex sheet in that group of M sheets. This reordering will be performed regardless of whether or not the series of duplex sheets located immediately subsequent to the simplex-to-duplex transition will fill the duplex paper path loop. This occurs because, in the example of FIG. 12, the controller is not capable of "looking" far enough into the series of unscheduled sheets to determine whether there are enough duplex sheets after the simplex-to-duplex transition to fill the duplex paper path loop. Regardless of this fact, the final output of sheets will not be affected since the simplex sheets which are shifted will still be output from the duplex paper path loop prior to the duplex sheets which were scheduled for side one imaging prior to these shifted simplex sheets. After reordering the sheets, the procedure proceeds to step S-42 where "normal" sheet scheduling is resumed. In this example, normal sheet scheduling can be the steps of proceeding to step S-6 in the control procedure illustrated in FIG. 9. In other words, the procedure illustrated in FIG. 12 can be implemented by inserting steps S-40 and S-41 between steps S-4 and S-6 in the procedure of FIG. 9.

The control procedure illustrated in FIG. 13 is similar to that of FIG. 12 except that it is usable with a controller which can look at least 2M-1 number of sheets into the series of sheets which have not yet been scheduled for insertion into the duplex paper path. Thus, the procedure of FIG. 13 can determine whether the number of duplex sheets which are to be output after the simplex-to-duplex transition will fill or exceed the duplex paper path loop capacity M. Thus, while steps S-50 and S-52 of FIG. 13 are the same as steps S-40 and S-42 of FIG. 12, the determination made in steps S-51 and S-51.5 differs from that made in S-41 of FIG. 12. In steps S-51 and S-51.5, all sheets, G, in a first subgroup of contiguous duplex sheets located after the simplex-to-duplex transition are shifted ahead of a number M minus G of simplex sheets located just prior to the transition if the number of duplex sheets in the first subgroup, G, is less than the capacity of the duplex paper path loop, M.

6. Conclusion

A variety of scheduling procedures are provided by the present invention which improve the efficiency of operation of an imaging device having an endless duplex paper path loop without a buffer tray. Unlike previous scheduling schemes which are "predictive" (i.e., the scheduling of sheets is determined prior to attempting to insert sheets into the duplex paper path loop, and the scheduling is inflexible to what actually occurs during the sheet insertion process and to the duplex paper path loop capacity), the present invention bases the scheduling of sheets on, among other things, what is actually occurring in the duplex paper path loop (i.e., whether the loop is full, whether any unexpected sheet gaps exist, whether surrounding sheets are simplex or duplex, etc.). Thus, procedures according to the present invention can be applied to many existing scheduling schemes to further improve their efficiency. For example, while all of the procedures for the present invention have been illustrated for a sheet insertion scheme which consecutively inserts sheets into the duplex loop, the procedures of the present invention can also be used in schemes which alternately insert sheets such as described above in reference to the Xerox "9700" copier and U.S. Pat. No. 4,935,786. For example, the procedures for filling unexpected sheet gaps, for converting simplex sheets to duplex sheets having blank back sides, and for reordering sheets at simplex-to-duplex transitions can be applied to copiers which alternately insert sheets.

Because the controller electronics knows so much about the sequence of imaging, and can change the page order, duplex is facilitated without a staging (buffer) tray. The elimination of requirements for a staging tray is accomplished because the system computer can predict any race-track (loop number) of documents, the arrival of the second side requirement, and intersperse second side imaging with first side imaging. An ancillary benefit of this type of duplexing is that even for small sheets, purging in the event of a problem does not require purging of an entire tray content but only the race track content which typically numbers only a very few sheets.

The present system also facilitates doing a variety of special duplexing operations such as signature making which previously were impossible or very difficult and cumbersome to do in light/lens systems.

While this invention has been described in conjunction with specific embodiments thereof, it is evident that many alternative, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method of scheduling sheets for printing and outputting collated sets of plural copy sheets from a multiple job set of multiple electronically reorderable page images, wherein said collated outputted copy sheets include at least duplex sheets having one said page image printed on one side of a copy sheet and another page image printed on an opposite side of said copy sheet, and wherein said printer includes an endless duplex paper path loop providing a plural copy sheet capacity duplexing path for recirculating therein plural copy sheets imaged on one side back to be imaged on their opposite side to make said duplex copies, said method comprising:
    determining the number of sheets required to print each collated set in each job to be printed;
    determining the image to be printed on the first and second sides of each sheet in each job to be printed;
    scheduling the sheets and images to be printed on each sheet for being passed through said duplex path so that said duplex path is substantially filled to capacity with sheets, which sheets are then printed with a side one image on their first sides, inverted in the duplex loop, printed with a side two image on their second sides, and outputted from said duplex loop, said duplex loop being immediately refilled with subsequent sheets without skipping any pitches in said duplex loop until filled to capacity for subsequent first and second side printing on said subsequent sheets, wherein said scheduling proceeds to substantially continuously fill said duplex loop to capacity with sheets while preserving the collated output of sets in each job regardless of set or job boundaries; and
    inserting sheets into said duplex paper path loop according to said scheduling.

2. The method according to claim 1, wherein said two-side printed duplex copy sheets are outputted from said endless duplex paper path loop in collated order.

3. The method according to claim 1, wherein said scheduling includes:
    electronically dividing each set in each job to be printed into batches of plural page images per batch with the number of page images per batch corresponding to said copy sheet capacity of said duplexing path;
    determining whether any of said batches includes skip pitches due to the number of page images in a set not being an integer multiple of said copy sheet capacity of said duplexing path; and
    electronically reconfiguring said batches by placing sheets from a subsequent batch into any preceding batch which contains skip pitches so that each batch is filled to said copy sheet capacity of said duplexing path.

4. The method according to claim 1, wherein when plural copies of documents are made, said scheduling is operable in a multiple-imaging mode, wherein the same images are printed on both sides of a number of consecutive sheets, so that the sheets outputted from said duplex loop are not collated, collation being performed by sorting and selectively placing said outputted sheets into different output bins.

5. The method according to claim 1, further comprising:
    monitoring said inserting, and determining whether and where any unscheduled sheet gaps exist between sheets in said duplex loop which have been printed with a side one image; and
    modifying said scheduling so that each said unexpected gap is filled when said gap is located adjacent a sheet insertion station by inserting and scheduling the next available sheet for side one imaging into said unexpected gap.

6. The method according to claim 5, wherein said modifying occurs only if said next available sheet is one of a duplex sheet and a simplex sheet having a final destination different from a destination of the next sheet station.

7. The method according to claim 6, wherein the next available sheet is converted to a duplex sheet having a blank back side if said next available sheet is a simplex sheet having a destination the same as the destination of the next sheet to pass said insertion station, said modifying occurring after said converting.

8. The method according to claim 7, further comprising:
    determining whether said simplex sheet is to be printed on paper which can be inverted, and converting said simplex sheet to a duplex sheet only if said simplex sheet is determined to be on paper which can be inverted.

9. The method according to claim 1, wherein the sheets to be scheduled include a plurality of duplex sheets having simplex sheets interspersed individually or in groups therein.

10. The method according to claim 9, wherein said scheduling includes converting any simplex sheets to be inserted into said duplex paper path loop into a duplex sheet having a blank back if an immediately previously scheduled sheet is duplex and said duplex paper path loop will not be filled with scheduled duplex or simplex sheets upon insertion of said immediately previously scheduled sheet.

11. The method according to claim 10, further comprising:
    determining whether said simplex sheet is to be printed on paper which can be inverted, and converting said simplex sheet to a duplex sheet only if said simplex sheet is determined to be on paper which can be inverted.

12. The method according to claim 9, said scheduling including:
    locating any simplex-to-duplex transitions in said series of sheets;

determining whether any sheet gaps exist between the side one image printing and the side two image printing of the duplex sheets located immediately after said simplex-to-duplex transition; and modifying said scheduling if said gaps exist therein by inserting simplex sheets located immediately prior to said transition into said gaps.

13. The method according to claim 12, wherein said capacity of said duplex paper path loop is M sheets, the number of sheet gaps determined is G, and said modifying includes shifting a number S of simplex sheets located prior to said transition into said gaps, wherein S is the lesser of the total number of consecutive simplex sheets located immediately prior to said transition and M-G.

14. The method according to claim 9, further comprising:

monitoring said inserting, and determining whether and where any unscheduled sheet gaps exist between sheets in said duplex loop which have been printed with a side one image; and modifying said scheduling so that each said unexpected gap is filled when said gap is located adjacent a sheet insertion station by inserting and scheduling the next available sheet for side one imaging into said unexpected gap.

15. The method according to claim 14, wherein said modifying occurs only if said next available sheet is one of a duplex sheet and a simplex sheet having a final destination different from a destination of the next sheet in said duplex paper path loop to pass said insertion station.

16. The method according to claim 15, wherein the next available sheet is converted to a duplex sheet having a blank back side if said next available sheet is a simplex sheet having a destination the same as the destination of the next sheet to pass said insertion station, said modifying occurring after said converting.

17. The method according to claim 16, further comprising:

determining whether said simplex sheet is to be printed on paper which can be inverted, and converting said simplex sheet to a duplex sheet only if said simplex sheet is determined to be on paper which can be inverted.

18. The method according to claim 9, wherein the simplex sheets interspersed within the duplex sheets are located at an intermediate location within a copy set.

19. The method according to claim 1, wherein every sheet which is scheduled is a duplex sheet.

20. In a method of scheduling a series of sheets for insertion into, forming of images on, and outputting from an imaging system, said imaging system having an endless duplex paper path loop providing a plural copy sheet capacity duplexing path equal to M pitches for recirculating therein plural copy sheets imaged on one side back to be imaged on their opposite side to make duplex copies, said imaging system including means for forming images on sheets in a portion of said duplex paper path loop, means for inverting copy sheets imaged on one side prior to being recirculated back to be imaged on their opposite side, and control means for controlling the flow of copy sheets through said duplex paper path loop so that sheets to be duplex imaged are inverted and recirculated back to said means for forming images after being imaged on one side while sheets to be simplex imaged are outputted from said duplex paper path loop after being imaged on one side, said method of scheduling including scheduling sheets for simplex imaging by determining a pitch of said duplex paper path loop into which the sheet will be inserted and imaged on one side and scheduling sheets for duplex imaging by determining a pitch of said duplex paper path loop into which the sheet will be inserted and imaged on side one, said same pitch being reserved for said same sheet to receive its side two image upon being recirculated back to said means for forming images, the improvement comprising:

(a) determining whether a pitch located adjacent an insertion station is reserved for a duplex sheet side two image and scheduling the side two image to be formed on this sheet if so reserved, then repeating step (a); otherwise (b) determining the number of pitches since the last sheet which was a duplex side one was scheduled; and (c) scheduling the next available unscheduled sheet for side one imaging at the pitch located adjacent said insertion station and reserving said pitch for said same sheet to receive its side two image if it is a duplex sheet unless the determined number of pitches in step (b) is less than M, said next available unscheduled sheet is simplex, and an immediately previous scheduled pitch was for a side one duplex image, then repeating step (a).

21. The method according to claim 20, further comprising inserting said series of sheets into consecutive pitches of said duplex paper path loop according to said schedule.

22. The method according to claim 21, further comprising:

monitoring said inserting, and determining whether and where any unscheduled sheet gaps exist between sheets in said duplex loop which have been printed with a side one image; and modifying said scheduling so that each said unexpected gap is filled when said gap is located adjacent a sheet insertion station by inserting and scheduling the next available sheet for side one imaging into said unexpected gap.

23. The method according to claim 22, wherein said modifying occurs only if said next available sheet is one of a duplex sheet or a simplex sheet having a final destination different from a destination of the next sheet in said duplex paper path loop to pass said insertion station.

24. The method according to claim 23, wherein the next available sheet is converted to a duplex sheet having a blank back side if said next available sheet is a simplex sheet having a destination the same as the destination of the next sheet to pass said insertion station, said modifying occurring after said converting.

25. The method according to claim 24, further comprising:

determining whether any simplex sheet to be converted is to be printed on duplexable stock, and converting simplex sheets to duplex sheets only if said simplex sheet is on duplexable stock.

26. The method according to claim 20, wherein the sheets to be scheduled include a plurality of duplex sheets having simplex sheets interspersed individually or in groups therein.

27. The method according to claim 26, wherein said scheduling includes converting any simplex sheets to be inserted into said duplex paper path loop into a duplex sheet having a blank back if an immediately previously scheduled sheet is duplex and said duplex paper path loop will not be filled with scheduled duplex or simplex sheets upon insertion of said immediately previously scheduled sheet.

28. The method according to claim 27, further comprising:
   determining whether any simplex sheet to be converted is to be printed on duplexable stock, and converting simplex sheets to duplex sheets only if said simplex sheet is on duplexable stock.

29. The method according to claim 26, said method further comprising, prior to performing step (b):
   (i) determining whether a simplex-to-duplex side one transition occurs within a next available group of M sheets which have not yet been scheduled, and if said transition does occur, shifting all sheets in a first subgroup of contiguous duplex sheets within said group of M sheets ahead of a first simplex sheet in said group of M sheets, then proceeding to step (b).

30. The method according to claim 26, said method further comprising, prior to performing step (b):
   (i) determining whether a simplex-to-duplex side one transition occurs within a next available group of M sheets which have not yet been scheduled, and if said transition does occur, shifting all sheets, G, in a first subgroup of contiguous duplex sheets located after said simplex-to-duplex side one transition ahead of a number, M-G, of simplex sheets located just prior to said transition if G is less than M, then proceeding to step (b).

31. The method according to claim 26, further comprising:
   monitoring said inserting, and determining whether and where any unscheduled sheet gaps exist between sheets in said duplex loop which have been printed with a side one image; and
   modifying said scheduling so that each said unexpected gap is filled when said gap is located adjacent a sheet insertion station by inserting and scheduling the next available sheet for side one imaging into said unexpected gap.

32. The method according to claim 31, wherein said modifying occurs only if said next available sheet is one of a duplex sheet or a simplex sheet having a final destination different from a destination of the next sheet in said duplex paper path loop to pass said insertion station.

33. The method according to claim 32, wherein the next available sheet is converted to a duplex sheet having a blank back side if said next available sheet is a simplex sheet having a destination the same as the destination of the next sheet to pass said insertion station, said modifying occurring after said converting.

34. The method according to claim 33, further comprising:
   determining whether any simplex sheet to be converted is to be printed on duplexable stock, and converting simplex sheets to duplex sheets only if said simplex sheet is on duplexable stock.

35. The method according to claim 26, wherein the simplex sheets interspersed within the duplex sheets are located at an intermediate location within a copy set.

36. A method of scheduling sheets for printing and outputting collated sets of plural copy sheets from a multiple job set of multiple electronically reorderable page images, wherein said collated outputted copy sheets include at least duplex sheets having one said page image printed on one side of a copy sheet and another page image printed on an opposite side of said copy sheet, and wherein said printer includes an endless duplex paper path loop providing a plural copy sheet capacity duplexing path for recirculating therein plural copy sheets image on one side back to be image on their opposite side to make said duplex copies, said method comprising:
   scheduling a series of sheets for being passed through said duplex loop, said scheduling including:
      determining when each sheet is to be inserted into the duplex loop;
      determining when a side one image for each sheet in the duplex loop is to be printed on each sheet;
      determining when a side two image for each sheet in the duplex loop which has been printed with a side one image is to be printed on an opposite side of each sheet and
      determining when each sheet is to be outputted from said duplex loop;
   inserting each consecutive sheet into the duplex loop at an insertion station according to said scheduling;
   monitoring said inserting, and determining whether and where any scheduled sheet gaps exist between sheets in said duplex loop which have been printed with a side one image; and
   modifying said scheduling so that said unexpected gap is filled when said gap is located adjacent said insertion station by inserting and scheduling the next available sheet for side one imaging in said unexpected gap.

37. In a method of scheduling a series of sheets for insertion into, forming of images on, and outputting from an imaging system, said imaging system having an endless duplex paper path loop providing a plural copy sheet capacity duplexing path equal to M pitches for recirculating therein plural copy sheets imaged on one side back to be imaged on their opposite side to make duplex copies, said imaging system including means for forming images on sheets in a portion of said duplex paper path loop, means for inverting copy sheets imaged on one side prior to being recirculated back to be imaged on their opposite side, and control means for controlling the flow of copy sheets through said duplex paper path loop so that sheets to be duplex imaged are inverted and recirculated back to said means for forming images after being imaged on one side while sheets to be simplex imaged are outputted from said duplex paper path loop after being imaged on one side, said method of scheduling including scheduling sheets for simplex imaging by determining a pitch of said duplex paper path loop into which the sheet will be inserted and imaged on one side and scheduling sheets for duplex imaging by determining a pitch of said duplex paper path loop into which the sheet will be inserted and imaged on side one, said same pitch being reserved for said same sheet to receive its side two image upon being recirculated back to said means for forming images, the improvement comprising:
   (a) determining whether a pitch located adjacent an insertion station is reserved for a duplex sheet side two image and scheduling the side two image to be formed on this sheet if so reserved, then repeating step (a); otherwise
   (b) determining whether the next available unscheduled sheet is duplex and scheduling said next available unscheduled sheet for side one imaging at the pitch located adjacent said insertion station and reserving said pitch for said same sheet to receive its side two image if its is a duplex sheet, then repeating step (a); otherwise scheduling said next available unscheduled sheet for simplex imaging unless said sheet has a final destination the same as an immediately previously scheduled sheet, said immediately previously scheduled sheet is duplex and pitches reserved for receiving duplex side two images exist in said duplex paper path loop, then repeating step (a).

38. The method according to claim 37, wherein the sheets to be scheduled include a plurality of duplex sheet having simplex sheets interspersed individually or in groups therein.

39. The method according to claim 38, wherein the simplex sheets interspersed within the duplex sheets are located at an intermediate location within a copy set.

40. The method according to claim 38, wherein said scheduling includes, prior to step (a), converting any simplex sheets to be inserted into said duplex paper path loop into a duplex sheet having a blank back if an immediately previously scheduled sheet is duplex and said duplex paper path loop will not be filled with scheduled duplex or simplex sheets upon insertion of said immediately previously scheduled sheet.

41. The method according to clam 40, further comprising:
determining whether any simplex sheet to be converted is to be printed on duplexable stock, and converting simplex sheets to duplex sheets only if said simplex sheet is on duplexable stock.

42. The method according to claim 38, further comprising, prior to performing step (b):
(i) determining whether a simplex-to-duplex side one transition occurs within a next available group of M sheets which have not yet been scheduled, and if said transition does occur, shifting all sheets in a first subgroup of contiguous duplex sheets within said group of M sheets ahead of a first simplex sheet in said group of M sheets, then proceeding to step (b).

43. The method according to claim 38, further comprising, prior to performing step (b):
(i) determining whether a simplex-to-duplex side one transition occurs within a next available group of M sheets which have not yet been scheduled, and if said transition does occur, shifting all sheets, G, in a first subgroup of contiguous duplex sheets located after said simplex-to-duplex side one transition ahead of a number, M-G, of simplex sheets located just prior to said transition if G is less than M, then proceeding to step (b).

44. The method according to claim 37, further comprising, prior to performing step (b):
(i) determining whether a simplex-to-duplex side one transition occurs within a next available group of M sheets which have not yet been scheduled, and if said transition does occur, shifting all sheets in a first subgroup of contiguous duplex sheets within said group of M sheets ahead of a first simplex sheet in said group of M sheets, then proceeding to step (b).

45. The method according to claim 37, further comprising, prior to performing step (b):
(i) determining whether a simplex-to-duplex side one transition occurs within a next available group of M sheets which have not yet been scheduled, and if said transition does occur, shifting all sheets, G, in a first subgroup of contiguous duplex sheets located after said simplex-to-duplex side one transition ahead of a number, M-G, of simplex sheets located just prior to said transition if G is less than M, then proceeding to step (b).

46. A method of scheduling sheets for printing and outputting collated sets of plural copy sheets from a multiple job set of multiple electronically reordable page images, wherein said collated outputted copy sheets include at least duplex sheets having one said page image printed on one side of a copy sheet and another page image printed on an opposite side of said copy sheet, and wherein said printer includes an endless duplex paper path loop providing a plural copy sheet capacity duplexing path for recirculating therein plural copy sheets imaged on one side back to be imaged on their opposite side to make said duplex copies, said method comprising:
determining a duplex printing schedule for printing a series of sheets to be passed through said duplex loop and having duplex printing performed thereon, said determining including:
determining when each sheet is to be inserted into the duplex loop;
determining when a side one image for each sheet in the duplex loop is to be printed on each sheet;
determining when a side two image for each sheet in the duplex loop which has been printed with a side one image is to be printed on an opposite side of each sheet; and
determining when each sheet is to be outputted from said duplex loop;
determining whether any sheet gaps exist in said duplex printing schedule between said side one image printing and said side two image printing; and
modifying said duplex printing schedule if gaps exist therein by inserting any simplex sheets which have been scheduled for printing immediately prior to said duplex printing schedule into said gaps.

47. The method according to claim 46, wherein the sheets to be scheduled include a plurality of duplex sheets having simplex sheets interspersed individually or in groups therein.

48. The method according to claim 47, wherein the simplex sheets interspersed within the duplex sheets are located at an intermediate location within a copy set.

49. The method according to claim 47, wherein said capacity of said duplex paper path loop is M sheets, the number of sheet gaps determined if G, and said modifying includes shifting a number S of simplex sheets which have been scheduled for printing immediately prior to said duplex printing schedule into said gaps, wherein S is the lesser of the total number of consecutive simplex sheets scheduled immediately prior to said duplex sheets and M-G.

50. In a method of scheduling a series of sheets for insertion into, forming of images on, and outputting from an imaging system, said imaging system having an endless duplex paper path loop providing a plural copy sheet capacity duplexing path equal to M pitches for recirculating therein plural copy sheets imaged on one side back to be imaged on their opposite side to make duplex copies, said imaging system including means for forming images on sheets in a portion of said duplex paper path loop, means for inverting copy sheets imaged on one side prior to being recirculated back to be imaged on their opposite side, and control means for controlling the flow of copy sheets through said duplex paper path loop so that sheets to be duplex imaged are inverted and recirculated back to said means for forming images after being imaged on one side while sheets to be simples imaged are outputted from said duplex paper path loop after being imaged on one side, said method of scheduling including scheduling sheets for simplex imaging by determining a pitch of said duplex paper path loop into which the sheet will be inserted and image on one side and scheduling sheets for duplex imaging by determining a pitch of said duplex paper path loop into which the sheet will be inserted and imaged on side one, said same pitch being reserved for said same sheet to receive its side two image upon being recirculated back to said means for forming images, the improvement comprising:

(a) determining whether a pitch located adjacent an insertion station is reserved for a duplex sheet side two image and scheduling the side two image to be formed on this sheet if so reserved, then repeating step (a); otherwise (b) determining whether a simplex-to-duplex side one transition occurs within a group of M sheet which have not yet been scheduled, if said transition does occur, shifting all sheets in a first subgroup of contiguous duplex sheets within said group of M sheets ahead of a first simplex sheets in said group of M sheets, and proceeding to schedule all of the sheets in said Group of M sheets after said shifting, then repeating step (a).

51. In a method of scheduling a series of sheets for insertion into, forming of images on, and outputting from an imaging system, said imaging system having an endless duplex paper path loop providing a plural copy sheet capacity duplexing path equal to M pitches for recirculating therein plural copy sheets imaged on one side back to be imaged on their opposite side to make duplex copies, said imaging system including means for forming images on sheets in a portion of said duplex paper path loop, means for inverting copy sheets imaged on their opposite side, and control means for controlling the flow of copy sheets through said duplex paper path loop so that sheets to be duplex imaged are inverted and recirculated back to said means for forming images after being imaged on one side while sheets to be simplex imaged are outputted from said duplex paper path loop after being imaged on one side, said method of scheduling including scheduling sheets for simplex imaging by determining a pitch of said duplex paper path loop into which the sheet will be inserted and imaged on one side and scheduling sheets for duplex imaging by determining a pitch of said duplex paper path loop into which the sheet will be inserted and imaged on side one, said same pitch being reserved for said same sheet to receive its side two image upon being recirculated back to said means for forming images, the improvement comprising:

(a) determining whether a pitch located adjacent an insertion station is reserved for a duplex sheet side two image and scheduling the side two image to be formed on this sheet if so reserved, then repeating step (a); otherwise (b) determining whether a simplex-to-duplex side one transition occurs within a group of M sheets which have not yet been scheduled, and if said transition does occur, shifting all sheets G, in a first subgroup of contiguous duplex located after said simplex-to-duplex transition ahead of a number M-G of simplex sheets located just prior to said transition if G is less than M, and proceeding to schedule all of the shifted sheets after said shifting, then repeating step (a).

* * * * *